United States Patent
Seshadri et al.

(10) Patent No.: US 7,558,529 B2
(45) Date of Patent: *Jul. 7, 2009

(54) EARPIECE/MICROPHONE (HEADSET) SERVICING MULTIPLE INCOMING AUDIO STREAMS

(75) Inventors: Nambirajan Seshadri, Irvine, CA (US); James D. Bennett, San Clemente, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 481 days.

This patent is subject to a terminal disclaimer.

(21) Appl. No.: 11/120,676

(22) Filed: May 3, 2005

(65) Prior Publication Data

US 2006/0166716 A1 Jul. 27, 2006

Related U.S. Application Data

(60) Provisional application No. 60/646,272, filed on Jan. 24, 2005.

(51) Int. Cl.
*H04B 5/00* (2006.01)
(52) U.S. Cl. .................... 455/41.2; 455/569.1
(58) Field of Classification Search ............. 455/550.1, 455/556.1, 556.2, 569.1, 575.2, 41.2, 41.3; 381/74
See application file for complete search history.

(56) References Cited

U.S. PATENT DOCUMENTS

| | | | |
|---|---|---|---|
| 2002/0098878 A1* | 7/2002 | Mooney et al. ............. 455/569 |
| 2003/0068974 A1* | 4/2003 | Kanamaluru et al. ........ 455/3.06 |
| 2003/0087667 A1* | 5/2003 | Taniguchi et al. ............ 455/556 |
| 2005/0026560 A1* | 2/2005 | Villaverde et al. .......... 455/3.06 |
| 2005/0044372 A1* | 2/2005 | Aull et al. .................... 713/176 |
| 2005/0096096 A1* | 5/2005 | Birli et al. ................. 455/569.1 |
| 2005/0202857 A1* | 9/2005 | Seshadri et al. ........... 455/575.2 |
| 2005/0265316 A1* | 12/2005 | Liu et al. ..................... 370/352 |
| 2006/0166705 A1* | 7/2006 | Seshadri et al. .......... 455/569.1 |
| 2006/0166715 A1* | 7/2006 | Van Engelen et al. ..... 455/575.2 |
| 2006/0166717 A1* | 7/2006 | Seshadri et al. .......... 455/575.2 |
| 2006/0166718 A1* | 7/2006 | Seshadri et al. .......... 455/575.2 |
| 2006/0193466 A1* | 8/2006 | Rodman ................. 379/406.06 |
| 2006/0194621 A1* | 8/2006 | Seshadri et al. .......... 455/569.1 |
| 2006/0252470 A1* | 11/2006 | Seshadri et al. .......... 455/575.2 |
| 2007/0025579 A1* | 2/2007 | Kolton ........................ 381/384 |

* cited by examiner

*Primary Examiner*—Nguyen Vo
(74) *Attorney, Agent, or Firm*—Garlick Harrison & Markison; Bruce E. Garlick; Shayne X. Short

(57) ABSTRACT

The present invention provides a modular wireless headset with which to service multiple incoming audio streams. This modular wireless headset includes a wireless microphone and wireless earpiece. The wireless earpiece may exchange radio frequency (RF) signals with a base unit and render content contained within the exchanged RF signals to a user. This wireless earpiece further includes a wireless interface, a processor, a speaker, a user interface, and an authentication module. The wireless interface allows the earpiece to wirelessly communicate with the base unit. The processor recovers communications exchanged with the base unit that the speaker then renders audible. A user interface coupled to the processor may alert the user to any additional incoming audio communications. Having received the alert, the user may select between the communications. The authentication module allows the wireless earpiece and microphone to pair (forming the modular wireless headset) and register the headset with the base unit.

23 Claims, 13 Drawing Sheets

EARPIECE/MICROPHONE (HEADSET) SERVICING MULTIPLE INCOMING AUDIO STREAMS

CROSS REFERENCES TO RELATED APPLICATIONS

This application claims the benefit of priority to U.S. Provisional Patent Application No. 60/646,272 entitled "EARPIECE/MICROPHONE (HEADSET) SERVICING MULTIPLE INCOMING AUDIO STREAMS," by Nambirajan Seshadri, et al. filed on Jan. 24, 2005, and is incorporated herein by reference in its entirety for all purposes. This Application is related to the following applications: application Ser. No. 10/981,418 entitled "UNIVERSAL WIRELESS MULTIMEDIA DEVICE," by Nambirajan Seshadri, et al., filed on Nov. 4, 2004, which is a continuation-in-part of application Ser. No. 10/856,430 entitled "PROVIDING A UNIVERSAL WIRELESS HEADSET," by Nambirajan Seshadri, et al., filed May 28, 2004 which claims priority under 35 USC § 119(e) to Provisional Application No. 60/473,967 filed on May 28, 2003; and application Ser. No. 10/981,418 is also a continuation-in-part of application Ser. No. 10/856,124 filed May 28, 2004 which claims priority under 35 USC § 119(e) to Provisional Application No. 60/473,675 filed May 28, 2003; application Ser. No. 10/976,300 entitled "MODULAR WIRELESS MULTIMEDIA DEVICE," by Nambirajan Seshadri, et al., filed on Oct. 27, 2004, which is a continuation-in-part of application Ser. No. 10/856,124 entitled "MODULAR WIRELESS HEADSET AND/OR HEADPHONES," filed May 28, 2004 which claims priority under 35 USC § 119(e) to Provisional Application No. 60/473,675, filed on May 28, 2003; and application Ser. No. 10/976,300 is also a continuation-in-part of application Ser. No. 10/856,430 filed May 28, 2004 which claims priority under 35 USC § 119(e) to Provisional Application No. 60/473,967 filed May 28, 2003; application Ser. No. 11/120,765 entitled "MODULAR EARPIECE/MICROPHONE THAT ANCHORS VOICE COMMUNICATIONS," by Nambirajan Seshadri, et al., filed on May 3, 2005, which claims priority under 35 USC § 119(e) to Provisional Application No. 60/656,828 filed on Feb. 25, 2005; application Ser. No. 11/122,146 entitled "HANDOVER OF CALL SERVICED BY MODULAR EARPIECE/MICROPHONE BETWEEN SERVICING BASE PORTIONS," by Nambirajan Seshadri, et al., filed on May 4, 2005, which claims priority under 35 USC § 119(e) to Provisional Application No. 60/653,234 filed on Feb. 15, 2005; application Ser. No. 11/120,900 entitled "MODULAR EARPIECE/MICROPHONE (HEADSET) OPERABLE TO SERVICE VOICE ACTIVATED COMMANDS," by Nambirajan Seshadri, et al., filed on May 3, 2005, application Ser. No. 11/120,903 entitled "BATTERY MANAGEMENT IN A MODULAR EARPIECE MICROPHONE COMBINATION," by Nambirajan Seshadri, et al., filed on May 3, 2005, which claims priority under 35 USC § 119(e) to Provisional Application No. 60/646,270 filed on Jan. 24, 2005; application Ser. No. 11/120,904 entitled "PAIRING MODULAR WIRELESS EARPIECE/MICROPHONE (HEADSET) TO A SERVICED BASE PORTION AND SUBSEQUENT ACCESS THERETO," by Nambirajan Seshadri, et al., filed on May 3, 2005, which claims priority under 35 USC § 119(e) to Provisional Application No. 60/646,437 filed on Jan. 24, 2005; application Ser. No. 11/120,902 entitled "MANAGING ACCESS OF MODULAR WIRELESS EARPIECE/MICROPHONE (HEADSET) TO PUBLIC/PRIVATE SERVICING BASE STATION," by Nambirajan Seshadri, et al., filed on May 3, 2005, which claims priority under 35 USC § 119(e) to Provisional Application No. 60/646,235 filed on Jan. 24, 2005; application Ser. No. 11/120,455 entitled "INTEGRATED AND DETACHABLE WIRELESS HEADSET ELEMENT FOR CELLULAR/MOBILE/PORTABLE PHONES AND AUDIO PLAYBACK DEVICES," by Josephus A. Van Engelen, et al., filed on May 3, 2005, which claims priority under 35 USC § 119(e) to Provisional Application No. 60/646,465 filed on Jan. 24, 2005, all of which are incorporated herein by reference in their entirety for all purposes.

BACKGROUND OF THE INVENTION

1. Field of the Invention

This invention generally relates to wireless communications and more particularly to providing secure and private access to servicing networks, to modular wireless headsets through public/private servicing base stations.

2. Background of the Invention

Wireless communications offer users the ability to be "wired" from almost anywhere in the world. Cellular telephones, satellite telephones, wireless local area networks, personal digital assistants (PDAs) with radio frequency (RF) interfaces, laptop computers with RF interfaces and other such devices enable these wireless communications. Such wireless communications have been extended to personal wireless networks, such as these defined by the Bluetooth specification. Not only have cellular telephones become very popular, but Wireless Local Area Networking (WLAN) devices have also proliferated. Thus, a single device may be able to wirelessly access multiple devices or networks. One standard for wireless networking, which has been widely accepted, is the Specification of the Bluetooth System, v. 1.0 ("Bluetooth Specification"). Wireless networking has introduced many security and privacy issues. This is especially true of devices that service real time communications through these wireless networks.

The Bluetooth Specification enables the creation of small personal area networks (PAN's) where the typical operating range of a device is 10 meters or less, or sometimes up to 100 meters under ideal conditions. In a Bluetooth system, Bluetooth devices sharing a common channel sequence form a piconet. Two or more piconets co-located in the same area, with or without inter-piconet communications, is known as a scattenet.

The Bluetooth Specification supports voice communications between Bluetooth enabled devices. When a pair of Bluetooth devices supports voice communication, the voice communications must be wirelessly supported in a continuous fashion so that carried voice signals are of an acceptable quality. One popular use of personal wireless networks couples a wireless headset(s) with cellular telephone(s), personal computer(s), and laptop(s), etc. The Bluetooth Specification provides specific guidelines for providing such wireless headset functionality. However, the ability to service multiple incoming audio streams from these diverse resources is lacking.

Bluetooth provides a headset profile that defines protocols and procedures for implementing a wireless headset to a device private network. Once configured, the headset functions simply as the device's audio input and output. As further defined by the Bluetooth Specification, the headset must be able to send AT (Attention) commands and receive resulting codes, such that the headset can initiate and terminate calls. The Bluetooth Specification also defines certain headset profile restrictions. These restrictions include an assumption that the ultimate headset is assumed to be the only use case active between the two devices. The transmission of audio is based on continuously variable slope delta (CVSD) modulation. The result is monophonic audio of a quality without perceived audio degradation. Only one audio connection at a time is supported between the headset and audio gateway. The audio gateway controls the synchronous connection orientated (SCO) link establishment and release. The headset directly connects and disconnects the internal audio stream upon SCO link establishment and release. Once the link is established, valid speech exists on the SCO link in both directions. The headset profile offers only basic inoperability such that the handling of multiple calls or enhanced call functions at the audio gateway is not supported. Another limitation relates to the manner which Bluetooth devices service only single channel audio communications. In most cases, the Bluetooth device is simply a replacement for a wired headset. Simple headsets cannot service multiple audio sources.

Thus, there is a need for improved servicing of multiple incoming audio streams operations by WLAN devices servicing audio or multimedia communications that provide additional user functionality and improved service quality.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
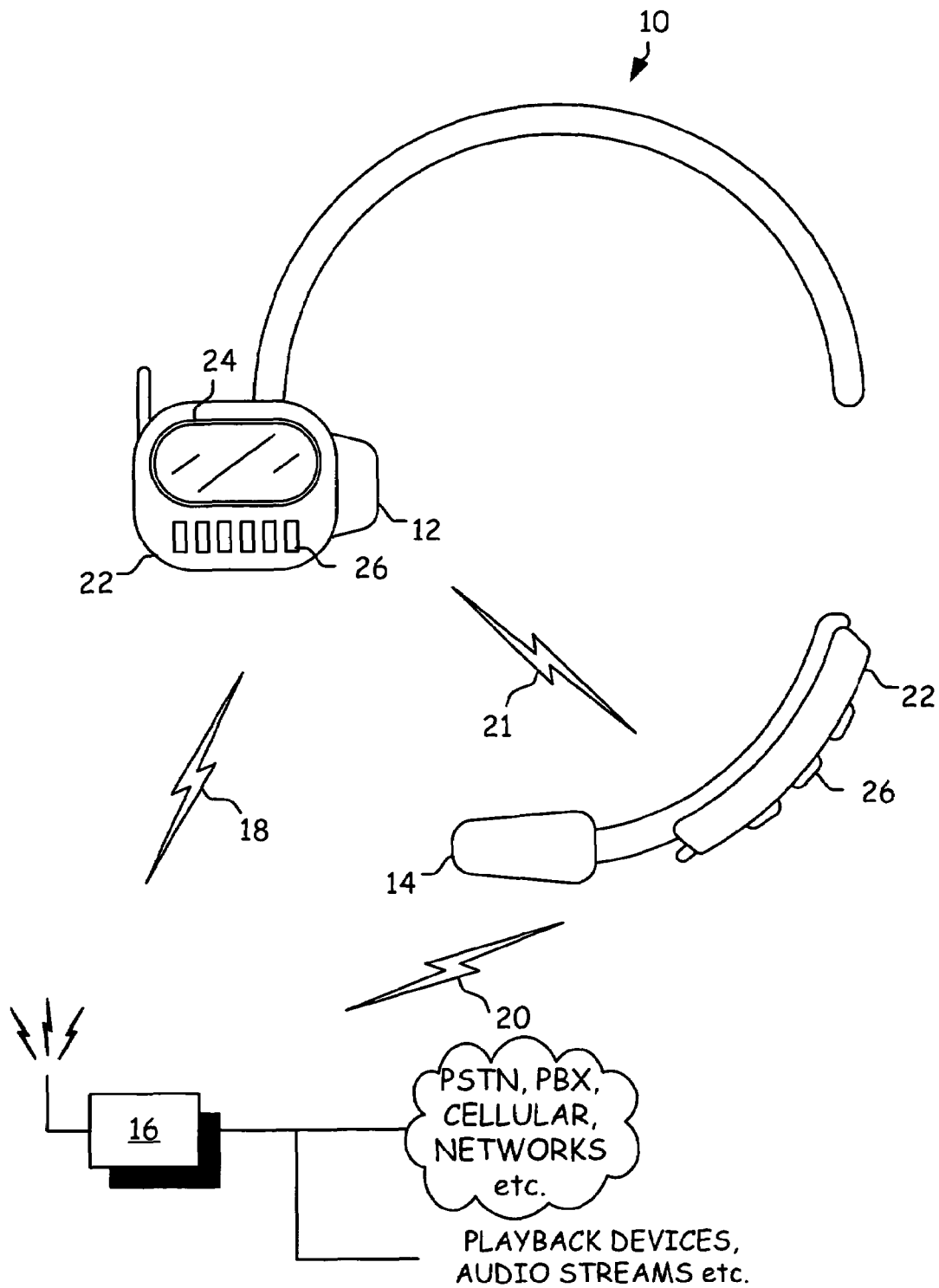
FIG. 1 is a diagram of a wireless headset in accordance with one embodiment of the present invention.

FIG. 1 is a diagram of a modular wireless headset 10 wirelessly coupled to base unit 16 through antennas 7. Modular wireless headset 10 includes wireless earpiece 12 and wireless microphone 14. Wireless earpiece 12 communicates wirelessly with microphone 14. However, wireless earpiece 12 and wireless microphone 14 may also physically couple to exchange information or establish an alternate communication pathway. Accordingly, earpiece 12 and microphone 14 may be separate communication devices. These distinct devices may couple to a headset frame 9. Frame 9 may include a shaped battery to both power and support the headset modules. Those devices may individually communicate with base unit 16 via separate communication pathways or through a single wireless interface contained either in the earpiece or microphone. As shown, earpiece 12 and microphone 14 may both communicate with base unit 16, which may be a cellular telephone, wire line telephone, laptop computer, personal computer, personal digital assistant, etc., using antennas 7 and transceiver (transmitter and/or receiver) 13 of FIG. 2 via a first communication pathway 18. The pathways between the microphone and headset may require the components to form a trusted pair. Base unit 16 may directly couple the headset to multiple playback devices, audio streams or voice communication networks such as radio, cellular, wireless voice or packet data, public switched telephone networks (PSTN), private branch exchanges or others known to those skilled in the art. Such a connection may often require additional authentication. For example, in the case of cellular networks, subscriber identification information is required. Additionally, as multiple audio sources are offered, the source(s) serviced may be selected by a user input, priority, predetermined preferences or other criteria known to those having ordinary skill in the art.

System Information or Subscriber Identification Modules (SIM) identify the modular wireless headset of the subscriber (to user) to a network. Additionally the SIM module within a cellular telephone or wireless packet data network terminal handles identification and provides data storage for user data such as phone numbers and network information. Thus, when the modular wireless headset contains a SIM module, the information therein may be used to interface the modular wireless headset with the cellular network through the base unit. The headset may also implement the higher layer protocols that allow the headset to directly own and control the voice communications serviced without the need for a private base unit that directly interfaces for a cellular telephone. The base unit interfaces and services the voice communication with the information provided by the modular wireless headset as allowed through a Bluetooth connection or short-range wireless connection as opposed to requiring a cellular wireless interface being dedicated to the wireless headset.

Figure 2:
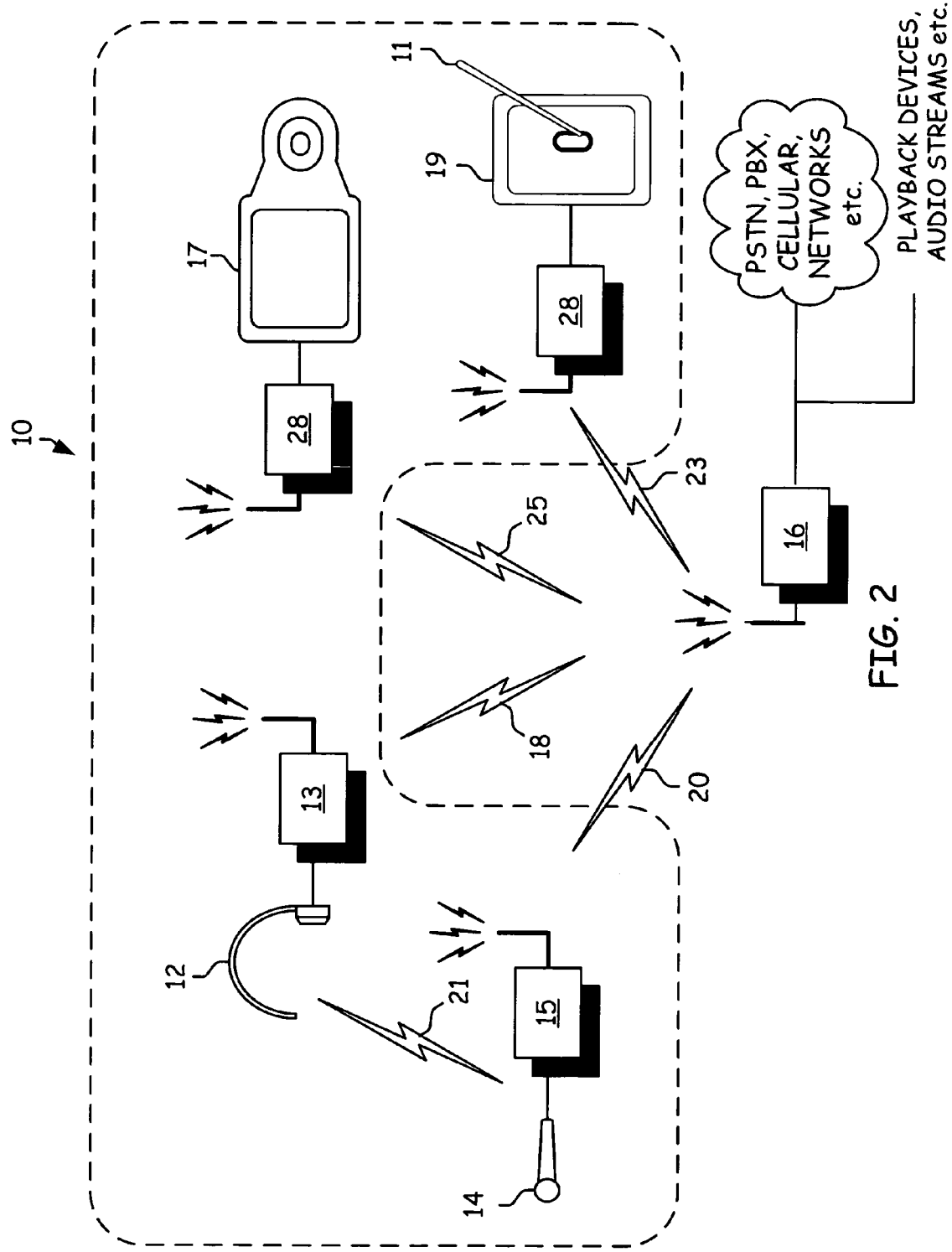
FIG. 2 is a diagram of another modular wireless headset in accordance with one embodiment of the present invention.

FIG. 2 shows transceivers 13 and 15 as being external to the earpiece 12 or Microphone 14. However, those transceivers may be integrated within earpiece 12 and microphone 14. Base unit 16 is operable to establish a wireless pathway to earpiece 12 and/or microphone 14 that may involve another trusted relationship that is established after exchanging and completing registration information. This pathway may be direct or via another wireless component and pathway, such as pathway 21. For example, wireless microphone 14 may communicate via base unit 16 through a wireless pathway between earpiece 12 and base unit 16. Similarly, wireless earpiece 12 could communicate with base unit 16 through wireless microphone 14. Microphone 14 may communicate with the base unit 16 or earpiece 12 using transceiver (or transmitter) 15 of FIG. 2 via communication pathway 20 or 21, respectively. Either or both earpiece 12 and microphone 14 may have a user interface 22. If the communication pathways are established in accordance with the Bluetooth specification, communication resources 18, 20, and 21 may be different timeslot allocations on the same synchronous connection orientated (SCO) link, or may be separate SCO links.

Earpiece 12 and microphone 14 both contain a pairing circuit. These pairing circuits are operable to pair the wireless earpiece and microphone when pairing information associated with the individual earpiece 12 and microphone 14 compare favorably. If the pairing information associated with the individual earpiece 12 and microphone 14 compares unfavorably, these individual components may not pair to form a modular wireless headset. Pairing allows the microphone and earpiece, after the wireless earpiece and microphone are successfully paired, to establish a wireless connection between them. Also in the event that one of the modular components needs to be added or replaced to the modular wireless headset 10, this component would have to pair to the other components present.

Pairing quite simply is the act of introducing two wireless devices to one another so that they can then communicate. Pairing enables the two or more wireless devices to join and become a trusted pair. Within a trusted pair, each device recognizes the other device(s). Then, each device can automatically accept communication and bypass the discovery and authentication process that normally happen during an initial wireless interaction between devices. Once the trusted pair is established, some embodiments may require user authentication before other devices are allowed to enter into the trusted pair. This prevents, for example, a second wireless earpiece, not of the trusted pair, from establishing communications with wireless headset 10. This could result in an untrusted earpiece eavesdropping on the voice communication serviced by modular wireless headset 10. Thus, pairing enables security and privacy for voice communications serviced by modular wireless headset 10. Additionally, some embodiments may only pair when a discoverability function associated with the wireless device is enabled. For example, the device may pair when physically coupled or when a user toggles a pairing switch located on user interface 22. When the discoverability/pairing function is not enabled, the wireless devices will not accept communications from unknown devices.

User interface 22 may also allow a user to initiate call functions or network hardware operations. These call functions include call initiation operations, call conferencing operations, call forwarding operations, call hold operations, call muting operations, and call waiting operations. Additionally, user interface 22 allows the user to access network interface functions, hardware functions, base unit interface functions, directory functions, caller ID functions, voice activated commands, playback commands and device programming functions. User interface 22 can be any combinations of a visual interface as evidenced by display 24, tactile interface as evidenced by buttons 26, and/or an audio interface.

Each of these devices, earpiece 12, microphone 14 and base unit 16, may support one or more versions of the Bluetooth Specification or other wireless protocols. A Bluetooth "scattenet" is formed from multiple "piconets" with overlapping coverage. A user of modular wireless headset 10 may establish communications with any available base unit 16. Wireless headset 10 may have a minimal user interface 22 where a single authenticate or register button initiates registration. Modular wireless headset 10 includes a registration circuit. This registration circuit needs to reside in either or both the wireless microphone and wireless earpiece. The registration circuit receives and exchanges registration information with base unit 16. Once this information is exchanged, the modular wireless headset, as well as base unit 16, compares their registration information with the exchanged information to determine whether or not modular wireless headset 10 is authorized to use base unit 16. Authorization will occur when the registration information within the modular wireless headset compares favorably to that of the base unit. This may involve accessing a third-party database in order to confirm where the base unit establishes communications between a servicing network, such as a cellular or public switch telephone network (PSTN) network, or a local authentication via a local database that may compare biometric, password user interface, VRS voice pattern recognition, encryption key/Donegal, in order to allow modular wireless headset 10 to access resources available through base unit 16.

Registration may determine what resources the headset may access. For example, access may be granted to an available one cellular network but not a wireless packet data network. As previously stated, this access may also depend on SIM information being authenticated by the cellular network. Registration may require physically coupling modular wireless headset 10 to base unit 16 or establishing wireless communications. In the case where wireless communications are established, this may require additional user input or proximity testing to authenticate and register the modular wireless headset to the base unit. The base unit, as well as the modular wireless headset, may access memory either local or via server or network to validate the registration information associated with the other component. Thus, both the base unit and headset need to compare the registration information and result in a favorable comparison to complete a successful registration. This registration may require user approval in some instances. For example, where fees are required for access, the user may not authenticate registration to avoid the fee. Registration allows communications to be automatically exchanged between the modular wireless headset and the base unit. This improves both security and privacy for communications serviced using the modular wireless headset.

Wireless headset 10 may reside within the service coverage area of multiple base units. Thus, when headset 10 enters (or powers up in) an area with more than one functioning wireless network, a user may depress authenticate button 26, use a voice command or other means to start the authentication/registration process. With the button depressed, the wireless headset attempts to establish communications with base unit 16. Subsequent authentication operations are required to have the wireless headset join the selected network. These subsequent operations may include prompting the user for selection of the network, evaluating SIM information, requiring that an entry be previously made in an access list to allow wireless headset 10 to join or otherwise complete the authentication operations (registration).

Once wireless headset 10 joins a respective network, headset 10 may service voice communications with the base unit via respective WLAN links. Such calls will be received and managed by base unit 16 or headset 10. Management duties for the calls may be divided between base unit 16 and headset

10. For example, upper level portions of the cellular protocol stack may be supported by the headset while the lower level portions are supported by the base unit. Integrated circuits in either headset 10 or base unit 16 support call functions. These call functions include, but are not limited to, call initiation and termination, call conferencing operations, call forwarding operations, call hold operations, call muting operations, or call waiting operations, and may be initiated through user interface 22.

FIG. 2 is a diagram of a modular wireless headset that includes earpiece 12, microphone 14. This headset may also include display/camera 17, and portable touch-screen/whiteboard 19 to support net-meetings. Microphone 14, earpiece 12, display/camera 17 and portable touch-screen/whiteboard 19 may each be a separate physical device that communicates wirelessly when paired to form a modular wireless headset. Earpiece 12 is a separate device from microphone 14, that together function to provide the modular wireless headset shown in FIG. 1. Accordingly, earpiece 12, microphone 14, display/camera 17, and a portable touch-screen/whiteboard 19 are separate communication devices that may individually communicate with base units via separate or shared communication pathways. A single communication pathway using time division may be used to communicate between earpiece 12, microphone 14, display/camera 17, portable touch-screen/whiteboard 19 and base units (base units 30-37 or access point 21). These communications are secured by both pairing and registration. Encryption, validation, or other like methods known to those skilled in the art may also be used and support one-way or two-way audio, video or text communications. One way communications allow the headset to act as receivers to broadcast information, while two-way communications allow real-time voice communications, such as phone or radio communications, which may be augmented with data, text and video to support interactive net-meetings.

Figure 3:
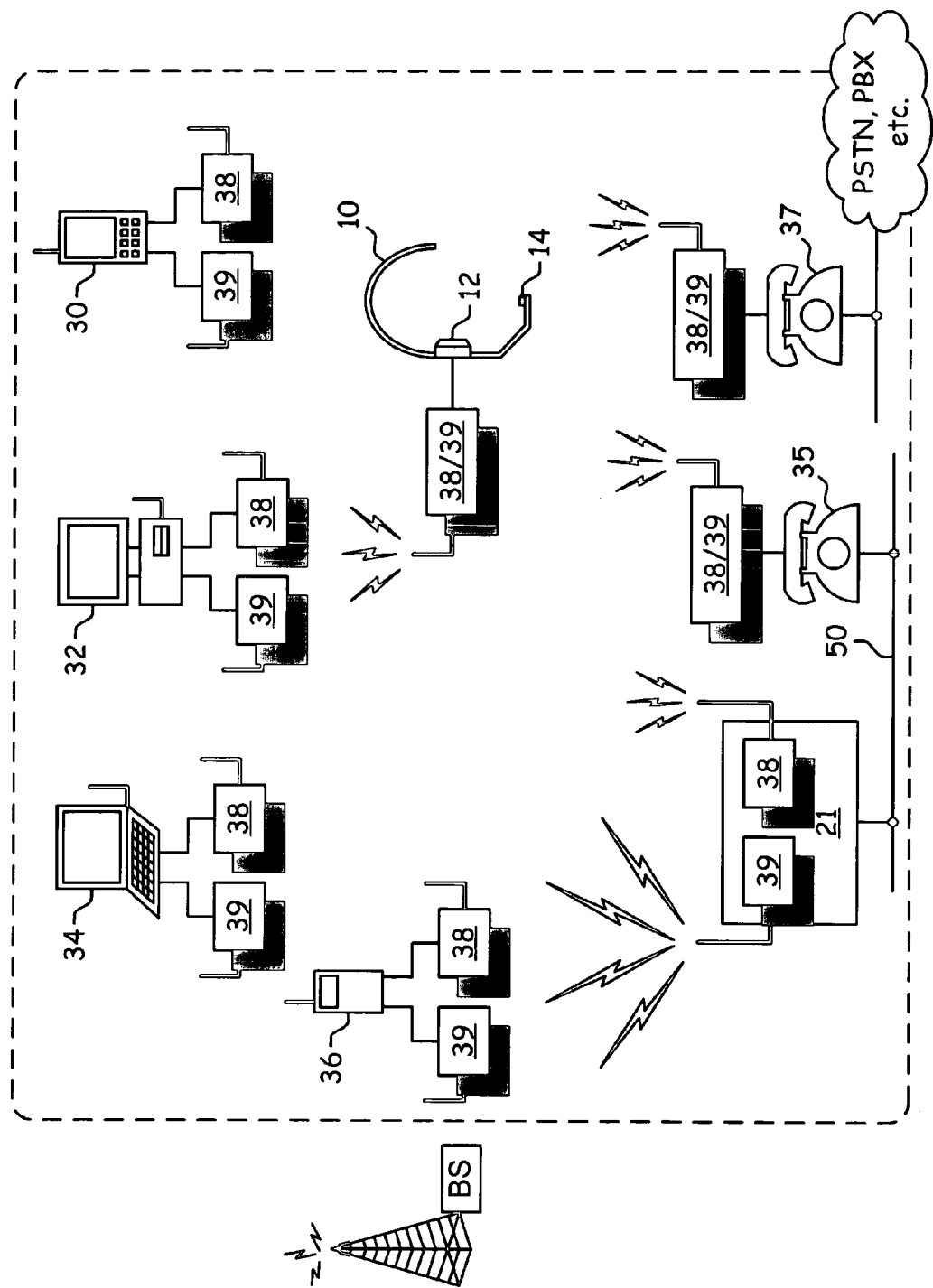
FIG. 3 is a diagram of a wireless headset operable to couple to various devices in accordance with one embodiment of the present invention.

Earpiece 12, once paired to form a modular wireless headset and registered to a base unit, may automatically communicate with base unit 16 and attached resources. FIG. 3 depicts those resources as a cellular telephone network, wire line telephone, Ethernet telephone, laptop computer, personal computer, personal digital assistant, etc, using transceiver (or receiver) 13 via a first communication pathways 18. Base unit 16 may establish a wireless pathway to earpiece 12 or microphone 14. The microphone 14, once authorized or validated, may communicate with the base unit 16 using transceiver (or transmitter) 15 via a second communication pathway 20 or by sharing communication pathway 18 with earpiece 12. Display/camera 17 and portable touch-screen/whiteboard 19 may communicate with the base unit 16 using transceivers (receivers and/or transmitters) 25 and 27 via communication pathways 21 and 23, respectively, or by relaying communications through another wireless component.

If the communication pathways are established in accordance with the Bluetooth specification, communication resources may be different timeslot allocations on the same synchronous connection orientated (SCO) link, or may be separate SCO links. These communication pathways may be secured by encryption, validation, pairing, or other like means to secure the communications exchanged with the base unit. Validation or pairing may prevent unauthorized devices from communicatively coupling to the base unit.

The quality of data provided to these devices may be adjusted according to which devices are actually present and supported. For example, audio quality can be improved and may even support stereo (multi-channel audio). This option may limit resources provided to microphone 14, display/camera 17, or whiteboard 19 to service multi-channel audio. Another example may favor the use of only earphone 12 and display/camera 17 to render streamed video and audio content. To coordinate the presentation of both audio and video in such an example, earphone 12 and display/camera 17 and their received communications may be synchronized to provide a quality viewing experience. Similarly, to coordinate the presentation of multiple audio channels, earphones 12 may be synchronized in order to provide a quality experience. To coordinate the presentation of real-time two-way audio earphones 12 and microphone 14 may be synchronized such that unacceptable delays do not exist within exchanged voice communications. This coordination ensures there is no undue delay between the presentations provided by these individual devices allowing the user to perceive a seamless presentation. This embodiment allows the headset to support net-meetings that require the delivery of complete Internet conferencing solutions with multi-point data conferencing, text chat, whiteboard, and file transfer, as well as point-to-point audio and video. Additionally, this allows the headset to coordinate the presentation of these different media formats without necessarily requiring shared physical connections of these devices.

Direct connectivity previously limited the physical structure that could be used for a wireless headset to support net-meetings. In many cases, this results in headsets that are cumbersome to use and uncomfortable to wear. The protocol used between modular components (base units, host devices, access points and other communicatively coupled devices) may allow the base unit to send data to each device in a coordinated manner that allows for the synchronized presentation of multimedia content by the devices. Alternatively, the information may be supplied to one component and then distributed within the trusted pair devices that make up the modular wireless headset. For example, one embodiment may allocate a predetermined portion of each data transmission for each media format. This would allow base unit 16 to transmit the same data to each device, wherein each device only processes that content intended for that device. In another embodiment, base unit or access point communicates in parallel with each device. By coordinating the data or packets exchanged with the devices, their individual presentations may be synchronized.

Earpiece 12 and microphone 14 may have on-chip operations to support voice communications, call conferencing, call waiting, flash, and other features associated with multiple audio streams or net-meetings. An on-chip SIM module may be present in embodiments that support cellular wireless packet data networking or other like networks that require this type of information to service voice communications. Call functions may me accessed and reviewed by a user interface and display within the base unit or a user interface and display located on or coupled to either earphone 12 or microphone 14. The user interface and display, located on or coupled to either the base unit or earphone 12 or microphone 14 may have a display and button(s) that may be used to program device, perform directory functions including selecting number to call, view caller ID, initiate call waiting, or initiate call conferencing. Additionally, circuitry within earphone 12 or microphone 14 may enable voice activated dialing. The actual voice recognition could be performed within earphone 12, microphone 14, or a base unit. Thus, earphone 12 or microphone 14 may act to initiate calls and receive calls. A link between earphone 12 and microphone 14 would allow earphone 12 or microphone 14 to share resources, such as battery life, and allow earphone 12 or microphone 14 to be recharged from a base unit.

Each of the devices 30-37 also includes piconet RF interface 38 and/or wireless interface 39. Piconet RF interface 38 may be constructed to support one or more versions of the Bluetooth specification. As such, each of the piconet RF interfaces 38-36 include a radio frequency transceiver that operates at 2.4 gigahertz and baseband processing for modulating and demodulating data that is transceived within a piconet. As such, wireless headset 10 may be wirelessly coupled with any one of the devices 30-37 and act as the headset communicatively coupled and registered to the devices 30-37.

Devices 30-37 may further include a wireless LAN (WLAN) RF interface 39. The wireless LAN RF interfaces 39 may be constructed in accordance with one or more versions of IEEE802.11 (a), (b), and/or (g) or other WLAN protocol known to those skilled in the art. Accordingly, each of the WLAN RF interfaces 39 include an RF transceiver that may operate in the 2.4 gigahertz range and/or in the 5.25 or 5.75 gigahertz range and further includes baseband processing to modulate and demodulate data that is transceived over the corresponding wireless communication link.

Contrasting the functionality of the piconet RF interfaces with the WLAN RF interfaces, piconet RF interfaces allow point-to-point communication between the associated devices, while the WLAN RF interfaces enable the associated devices to communicate indirectly via base units. For example, via piconet RF interfaces 38 laptop 34 can communicate directly with cellular telephone 36. In contrast, via WLAN RF interfaces 39, laptop 34 communicates indirectly, via access point 21, with cellular telephone 36. In general, the coverage area of a piconet is significantly smaller than the coverage area of a WLAN. Thus, for example, if headset 10 and cellular telephone 36 were unable to establish a piconet connection via piconet RF interfaces 38 due to distance between the devices. These devices would be able to establish a wireless communication link via the WLAN RF interfaces 39 and access point 21. Dual communication pathways allow communications to be switched between pathways, dependent on factors such as audio quality, signal strength, and available bandwidth.

Wireless headset 10 may establish a piconet with any one of the devices 30-37 or with access point 21, which includes WLAN RF interface 39 and piconet RF interface 38. As such, wireless headset 10 may function as the headset for wire line telephone 37, Ethernet telephone 35, personal digital assistant 30, personal computer 32, laptop computer 34 and/or cellular telephone 36 provided a piconet and registration can be established with the device. In accordance with the present invention, if a piconet cannot be established with the particular device, an extended network may be created utilizing the WLAN connectivity and at least one corresponding piconet.

If voice communications are to be serviced via wire line telephone 37 (i.e., the base unit for this example), but headset 10 is at a distance such that a piconet cannot be established between their piconet RF interfaces, and headset 10 is in a range to establish a piconet with cellular telephone 36, the piconet RF interfaces of cellular telephone 36 and headset 10, respectively, would establish a piconet, which may be established in accordance with the Bluetooth specification. With this piconet established, cellular telephone 36, via its WLAN RF interface, establishes a wireless connection with access point 21. Access point 21 then establishes a communication link with wire line telephone 37. Thus, a logical connection is established between headset 10 and wire line telephone 37 via cellular telephone 36 and access point 21. Note that wire line telephone 37 may be directly coupled to LAN 50 or coupled to a private branch exchange (PBX), which in turn is coupled to access point 21. Accordingly, within a wireless geographic area, the range of headset 10 may be extended utilizing the WLAN within the geographic area. As such, headset 10 extends the mobility of its user, extends the range of headset use and expands on headset functionality while preserving privacy and security by seeking service from base units to which it may be registered. Alternatively, headset 10 may establish a piconet with cell phone 36. This allows cell phone 36 to establish an alternate communication pathway for the communications serviced by wired telephone 37. Then it is possible for the call serviced by telephone 37 or 35 to be "handed off" to cellular telephone 36.

Figure 4:
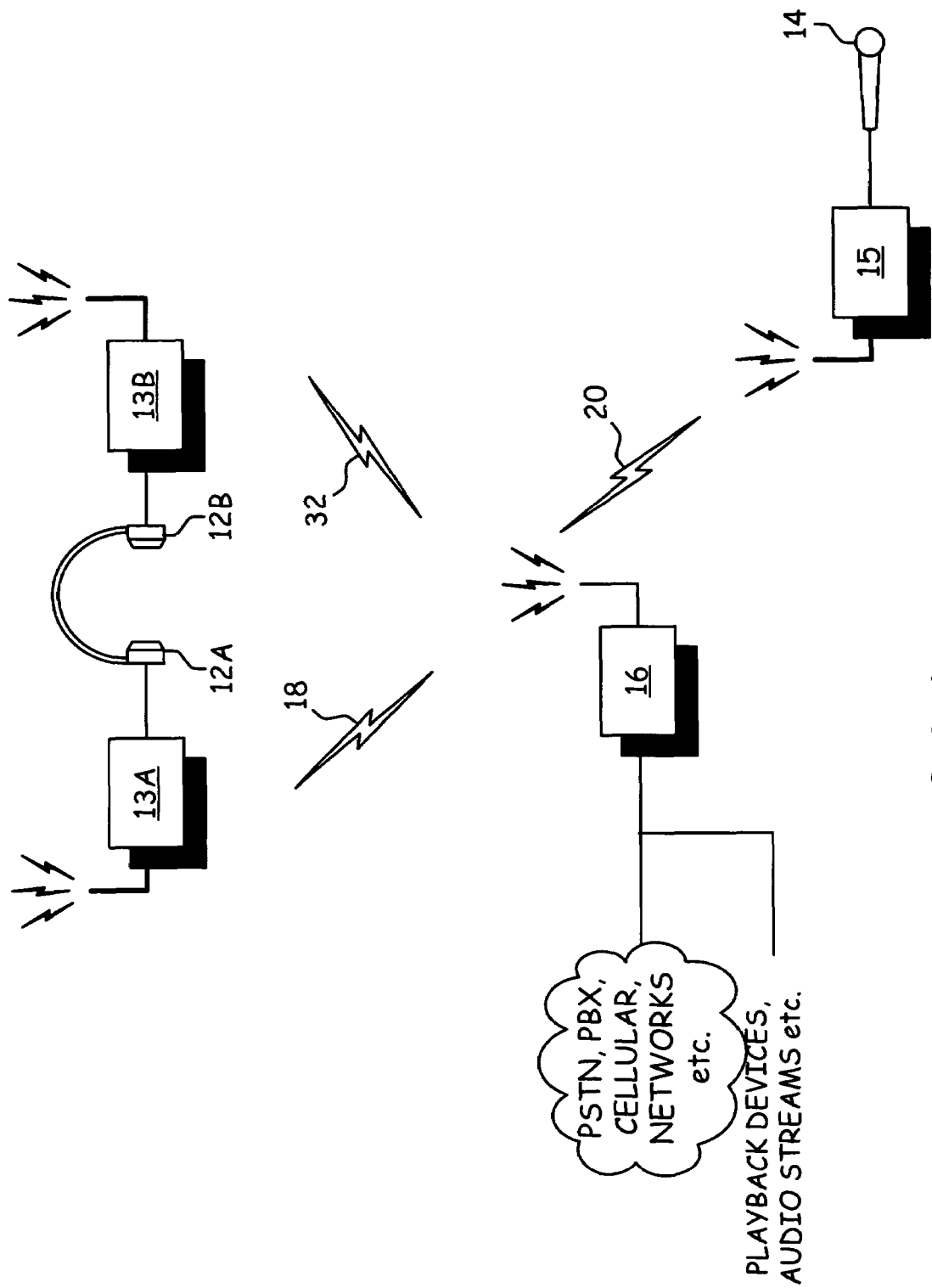
FIG. 4 is a block diagram of a multi-channel wireless headset in accordance with one embodiment of the present invention.

FIG. 4 is a diagram of another embodiment of a modular wireless headset 10 that includes two earpieces 12A and 12B, microphone 14, and user interface 22. In this configuration, microphone 14 communicates with base unit 16 via communication pathway 20, earpiece 12A communicates with base unit 16 using transceiver (or receiver) 13A via communication pathway 18 and earpiece 12B communicates with base unit 16 using transceiver (or receiver) 13B via communication pathway 32. Alternatively, earpieces 12A and 12B, and microphone 14 may establish a piconet and communicate with base unit 16 via a single communication pathway.

Figure 7:
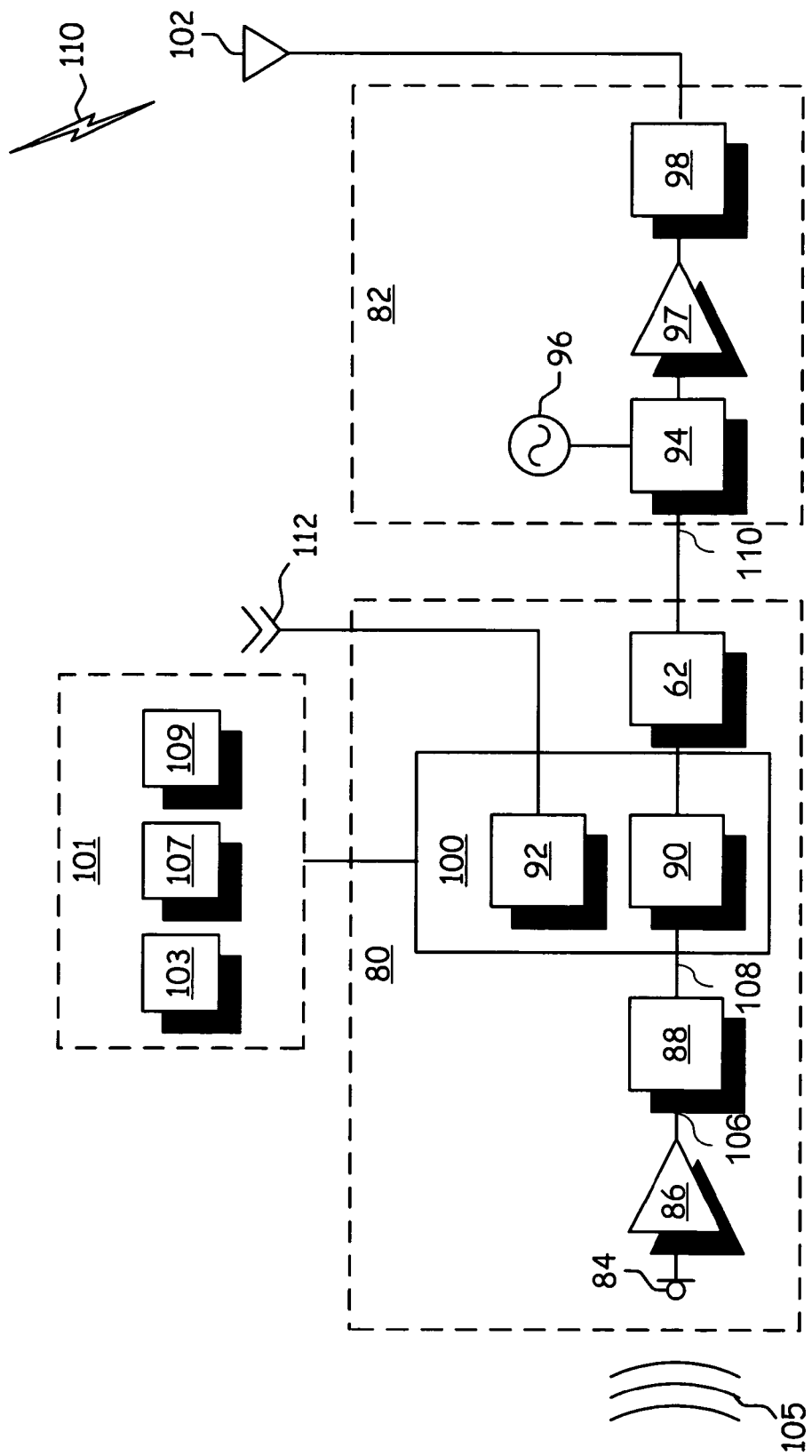
FIG. 7 is a functional block diagram of a wireless microphone in accordance with one embodiment of the present invention.

In operation, voice produced by the individual using microphone 14 is received via a microphone transducer and converted into RF signals by circuitry within microphone 14, as shown in FIG. 7. These RF signals are provided to base unit 16 via the previously identified communication pathways. Base unit 16 includes a corresponding receiver antenna 46 and receiver module to recapture the audio signals received via communication pathways 18, 20 and 32. In addition, base unit 16 includes at least one transmitter to transmit audio information to the earpiece(s) 12A and 12B. In one embodiment, base unit 16 may transmit left channel stereo information to earpiece 12A and right channel stereo information to earpiece 12B.

Wireless headphone(s) may be realized by omitting microphone 14 and including either one or both of earpieces 12A and 12B. In this embodiment, base unit 16 may be a playback device such as a CD player, DVD player, cassette player, etc. operable to stream audio information. If the display of FIG. 2 is utilized as well, both streaming audio and video may be enjoyed by the user.

Figure 5:
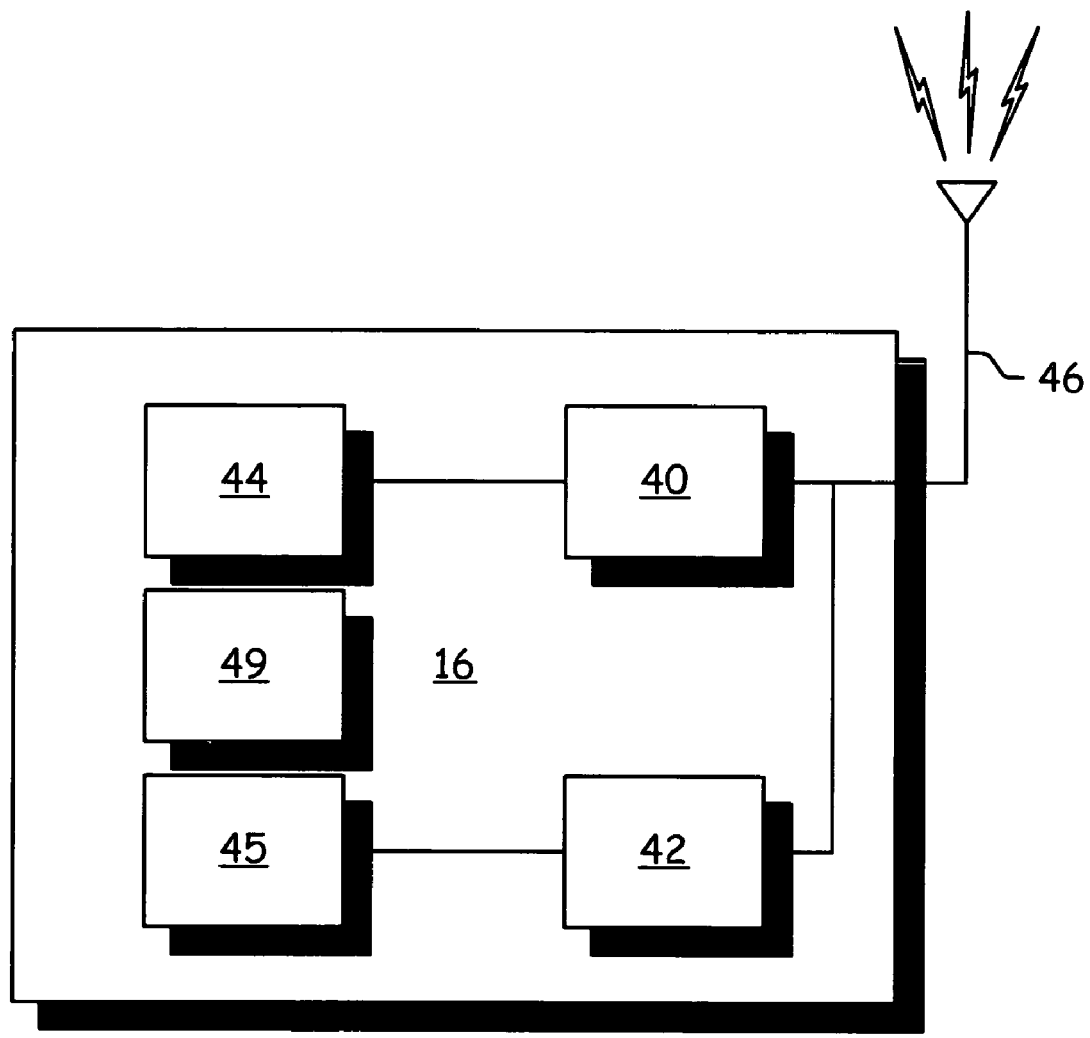
FIG. 5 is a schematic block diagram of an access point in accordance with one embodiment of the present invention.

FIG. 5 is a diagram of a base unit that supports modular wireless headsets. Base unit 16 includes a combination of transmitter and receiver (or transceiver) modules that accept and modulate or demodulate streamed audio, video, text, or data to and from earpiece(s) 12 and microphone 14, display 17 and whiteboard 19 through antenna 46. The base unit may be incorporated within or operably couple to another device such as a playback device, laptop, cellular telephone, land based telephone or other like device known to those skilled in the art. For example, one embodiment has transmitter module 40 and receiver module 42.

Base unit 16 also includes registration circuit 49 with which to compare registration information contained in memory available to base unit 16 and registration information received from headset 10. Registration may occur by physically coupling or docking headset 10 to the base unit or may occur wirelessly. Registration allows a trusted relationship to be established between base unit 16 and headset 10. This relationship ensures privacy and security of communication service by the wireless connection between base unit 16 and headset 10. This trusted relationship utilizes a pass key or other like means of verification to ensure that base unit 16 and headset 10 have permission to access one another. Once the trusted relationship is established through registration, the re-initialization of that relationship is not necessary in order to service communications between base unit 16 and headset 10. The registration information to be exchanged and compared may include voice patterns, biometric information, user tactile inputs in response to stimuli, password, voice recognized input, audio or video tests, encryption keys, handwriting recognition inputs, third party verification and testing, proximity information or other like information known to those skilled in the art. This same set of information may also be used in the previously identified paring process.

Transmitter module 40 accepts voice communications or unmodulated streamed audio, video, data or text from a servicing network or playback device 44 (e.g., DVD player, MP3 player, CD player, cassette player, or other like devices known to those skilled in the art). Playback device 44 may be integrated within base unit 16. Transmitter module 40 then modulates the streamed audio into low intermediate frequency (IF) signal. In the case where two earpieces are employed, multiple transmitter modules or time separation may be employed to modulate the streamed audio into low IF signals for the earpieces for each channel (i.e. left and right channels of stereo transmissions). These multiple signals are synchronized in their presentation to a user. Similarly, receiver module 42 accepts modulated streamed audio, video, data or text from headset 10. Receiver module 42 recovers signals from the received low IF signals. The recovered signals are then relayed to the servicing network or presentation device 45. Note that the generation of low IF signals and subsequent demodulation to recapture audio signal may be done in accordance with a particular wireless communication standard. For example, the Bluetooth specification may be used, IEEE802.11(a), (b), and/or (g) may also be used, etc. when base unit 16 couples to a telephone network (PSTN, cellular, satellite, WLAN, VoIP, etc.). Base unit 16 may receive data associated with the command as well. For example, caller ID information may be passed to user interface 22 or enhanced call operations may be initiated based on input received at the user interface.

Figure 6:
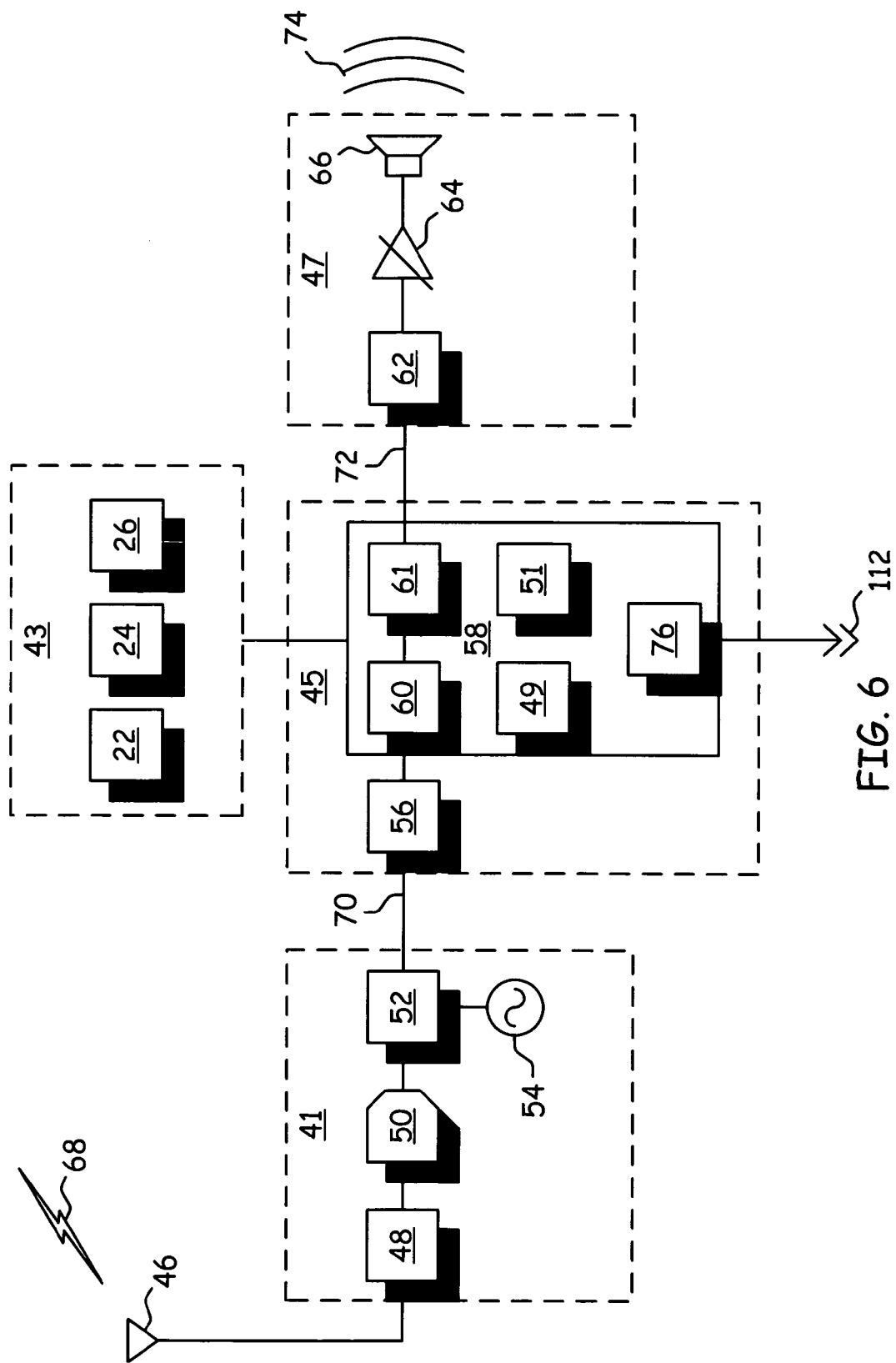
FIG. 6 is a functional block diagram of wireless earpiece in accordance with one embodiment of the present invention.

FIG. 6 is a schematic block diagram of earpiece 12. Earpiece 12 includes receiver module 41, optional user interface 43, processing module 45 and speaker module 47. Receiver module 40 includes antenna 46, bandpass filter 48, low noise amplifier 50, down converter 52 and local oscillator 54. User interface 43 can be any combinations of a visual interface as evidenced by display 22, tactile interface as evidenced by buttons 26, and/or an audio interface represented by microphone/speaker and may operably couple to processing module 58 to initiate call functions or playback functions which will be described further in FIG. 10.

Processing module 45 performs data recovery and includes an analog-to-digital converter (ADC) 56. The processing module may also include pairing circuit 49, registration circuit 51, and SIM modules. Digital channel filter 60 and demodulator 61 process the recovered signal while setup module 76, pairing circuit 49 and registration circuit 51 act to establish secure, private communications path with trusted devices and the base units. SIM module 53 is used to establish and service communications with networks coupled to the base unit. Speaker module 47 includes a digital-to-analog converter (DAC) 62, variable gain module 64, and at least one speaker 66 to render recovered communications.

Once the wireless connection is configured and trusted relationships are established, receiver module 41 receives inbound RF signal 68 from base unit 16 via antenna 46. Bandpass filter 48 filters the received RF signal 68 which are subsequently amplified by low noise amplifier 50. Down converter 52 converts the filtered and amplified RF signal 68 into low intermediate frequency (IF) signal 70 based on a local oscillator 54. Low IF signals 70 may have a carrier frequency at DC ranging to a few megahertz.

Processing module 45 receives low IF signals 70 and converts the low IF signals 70 into digital signals via ADC 56. Processing module 45 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory, which may contain SIM information (not shown), may be a single memory device or a plurality of memory devices. Such a memory device may be a read-only memory, random access memory, volatile memory, non-volatile memory, static memory, dynamic memory, flash memory, and/or any device that stores digital information. Note that when processing module 58 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Digital channel filter 60 receives the digital low IF signals 72 and filters these signals. Demodulator 61 recovers audio signals 74 from the filtered low IF signals. Note that the generation of RF signal 68 and subsequent demodulation to recapture audio signal 74 may be done in accordance with a particular wireless communication standard. For example, the Bluetooth specification may be used; IEEE802.11(a), (b), and/or (g) may also be used, etc.

Speaker module 47 converts digital audio signal 72 into analog signals rendered to the user through speakers 66. Adjustable gain module 64 adjusts the gain (i.e., adjusts volume), and provides the amplified signals to speaker 66, which produces audible signals 74. As long as the piconet remains in place between earpiece 12 and base unit 16, earpiece 12 will produce audible signals 74 from received inbound RF signal 68.

FIG. 7 is a schematic block diagram of microphone 14 that includes audio input module 80, transmitter module 82 and user interface 101. Audio input module 80 includes microphone 84, amplifier 86, ADC 88, processing module 100 that includes a setup module 92 and modulator 90, and DAC 62. Setup module 92 further includes a pairing circuit and an optional registration circuit and SIM module to establish secure, private communications as previously described. Although both the wireless earpiece and microphone may include a registration circuit and SIM module, some embodiments of the headset only require one registration circuit and SIM module. User interface 101 can be any combination of a visual interface as evidenced by display 103, tactile interface as evidenced by buttons 107, and/or an audio interface represented by microphone/speaker 109 and may operably couple to processing module 100 to initiate call functions which will be described further in FIG. 10. Transmitter module 82 includes up-converter 94, local oscillator 96, power amplifier 97, bandpass filter 98, and antenna 102.

Once microphone 14 is configured within a piconet, microphone 84 to receives audio signals 105 and converts these signals to analog signals 106. Amplifier 86 amplifies analog audio signals 106 that ADC 88 then converts into digital audio signals 108. Modulator 90 modulates the digital signals based on a predetermined communication standard. As shown, modulator 90 and setup module 92 are implemented within processing module 100. Processing module 100 may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Up-converter 94 converts modulated signals 110 into RF signals based on local oscillator 96. Power amplifier 97 amplifies these signals which may be subsequently processed by bandpass filter 98. The filtered RF signals are then transmitted via antenna 102 as outbound RF signals 110 to base unit 16. As long as the piconet is established to include microphone 14 and base unit 16 in a trusted pair, microphone 14 may transmit to base unit 16 in the manner described.

As shown in both FIGS. 6 and 7, separable connector 112 may physically connect setup modules 76 and 92. Such a physical connection allows for earpiece 12 and microphone 14 to communicate in both directions with the base unit. For example, if the devices are compliant with one or more versions of the Bluetooth Specification, base unit 16, functioning as the master, may issue a registration request to earpiece 12 coupled to microphone 14. Upon receiving this request, earpiece 12 and microphone 14 respond to the request indicating that RF channel(s) be established for the headset. Based on these responses, the master coordinates the establishment of the pathways and provides synchronization information through earpiece 12 and microphone 14 via receiver module 40 of earpiece 12. Setup modules 76 and 92 coordinate the registration of earpiece 12 and microphone 14 with the base unit, pairing of earpiece 12 and microphone 14, as well as coordinating timeslot assignments and/or SCO link assignments. Once the physical connection between earpiece 12 and microphone may be severed to establish earpiece 12 and microphone 14 as separate pieces. Alternatively, earpiece 12 and microphone 14 may each directly couple to the base unit to accomplish this setup.

Figure 8:
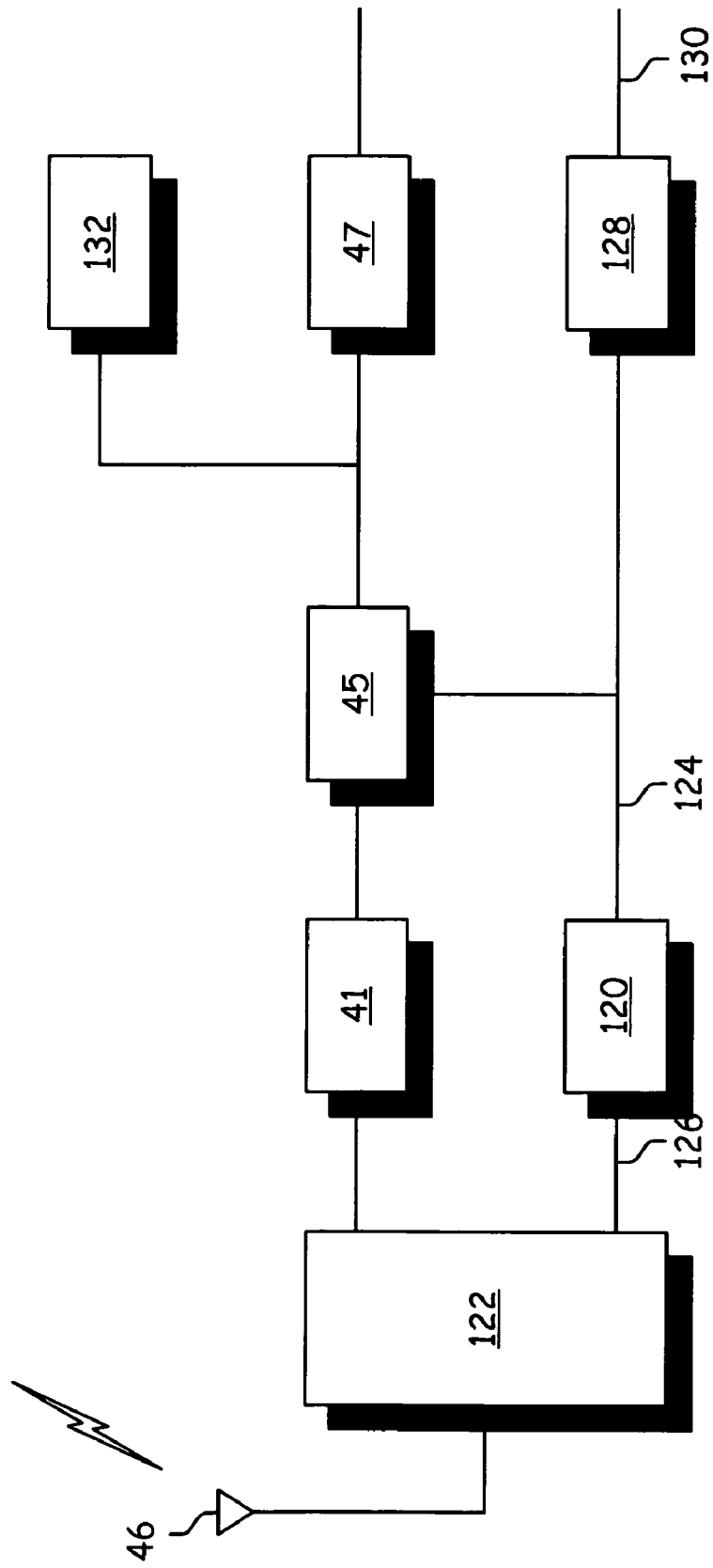
FIG. 8 is a schematic block diagram of a wireless microphone in accordance with the present invention.
Figure 9:
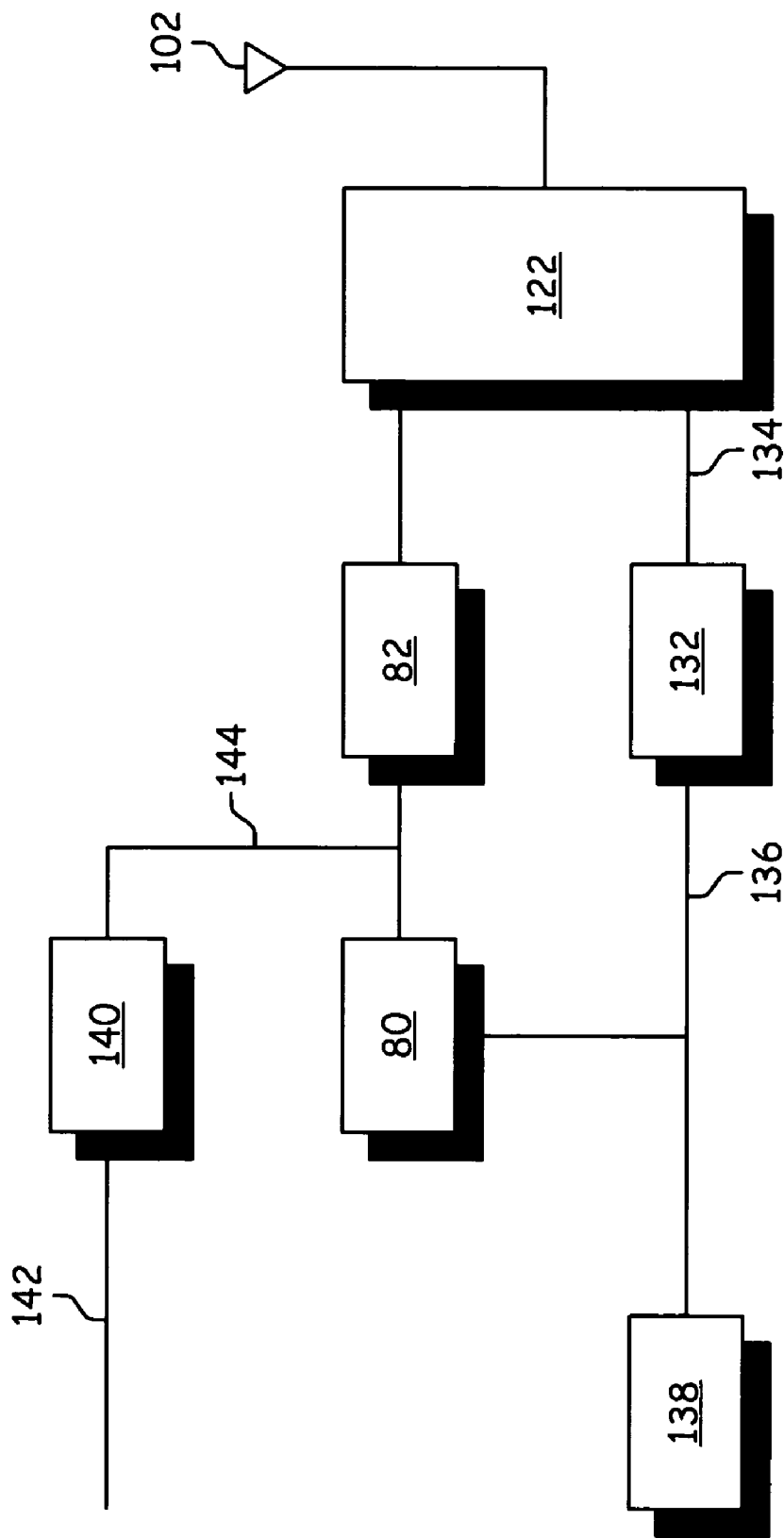
FIG. 9 is a schematic block diagram of a wireless microphone in accordance with the present invention.

FIGS. 8 and 9 illustrate schematic block diagrams of earpiece 12 and microphone 14 that include transceiver modules (i.e., receiver modules and transmitter modules). The use of the transceiver modules allow earpiece 12, microphone 14 and base unit 16 to be physically separate devices and be configured, paired and registered using wireless communications. As such, earpiece 12 and microphone 14 may be continuously worn on a person for receiving incoming calls and/or placing outgoing calls.

Earpiece 12, as shown in FIG. 8, includes antenna 46, transmit/receive switch 122, receiver module 41, processing module 45, speaker module 47, transmitter module 120, input module 128 and display module 132. Receiver module 41, processing module 45 and speaker module 47 operate as discussed with reference to FIG. 6. Processing module 45 may also produce display information for display module 132. For instance, the received RF signal may include information such as caller ID, command information, etc. which is separated by processing module 45 and provided to display module 132, which may be an LCD display, plasma display, etc.

Input module 128, which may be a keypad, touch screen, voice recognition circuit, or other like user interfaces, receives user commands and produces digital command messages 124 there from. Such digital command messages 124 include, but are not limited to, packet size, synchronization information, frequency hopping initiation information, timeslot allocation information, link establishment information, piconet address information, fast-forward, play, pause, volume adjust, record, stop and rewind.

Processing module 45 receives digital command messages 124, performs setup functions (i.e., pairing registration and SIM functions) and, when applicable, processes the command messages. For example, if the command message is with respect to a volume adjust; a graphical representation of adjusting the volume may be presented on display module 132 and the gain of amplifier 64 adjusted to adjust the volume associated with speaker 66. This command may also initiate pairing and registration.

Transmit module 120 receives digital command messages 124 and converts these messages into outbound RF command signals 126, which are subsequently transmitted to base unit 16 and/or microphone module via antenna 46. Accordingly, by including transmitter module 120 along with receiver module 41, earpiece 12 may function as a master and/or slave and exchange/relay data for other components.

FIG. 9 is a schematic block diagram of microphone 14 that includes audio input module 80, transmitter module 82, transmit receive switch 122, antenna 102, receiver module 132, input module 140 and display module 138. Input module 140 is operable to receive user input commands 142 and convert these commands into digital command messages 144. Input module 140 couples to or includes a user interface that allows a user to initiate call functions or network hardware operations, such as pairing registration and network access with SIM information. Network interface functions may include base unit interface functions, component interface functions, directory functions, caller ID functions, voice activated commands and device programming functions. This user interface can be any combinations of visual interface(s), tactile interface(s), and/or an audio interface(s) that allow the user to input commands 142. Digital command messages 144 may be similar to digital command messages 124 and may further include establish a call, terminate a call, call waiting, or other like functions. Transmitter module 82 converts digital command messages 144 into RF command signals 134 that are transmitted via antenna 102. Similarly, inbound RF command signals 135 may be received by receiver module 132 via antenna 102. Display module 138, which may be a LCD display, plasma display, etc., receives digital command messages 136 and may display corresponding configuration messages. In addition, any display information received from the host and/or microphone module regarding setup, operation, or as part of the data content, may be displayed on display module 138.

Figure 10:
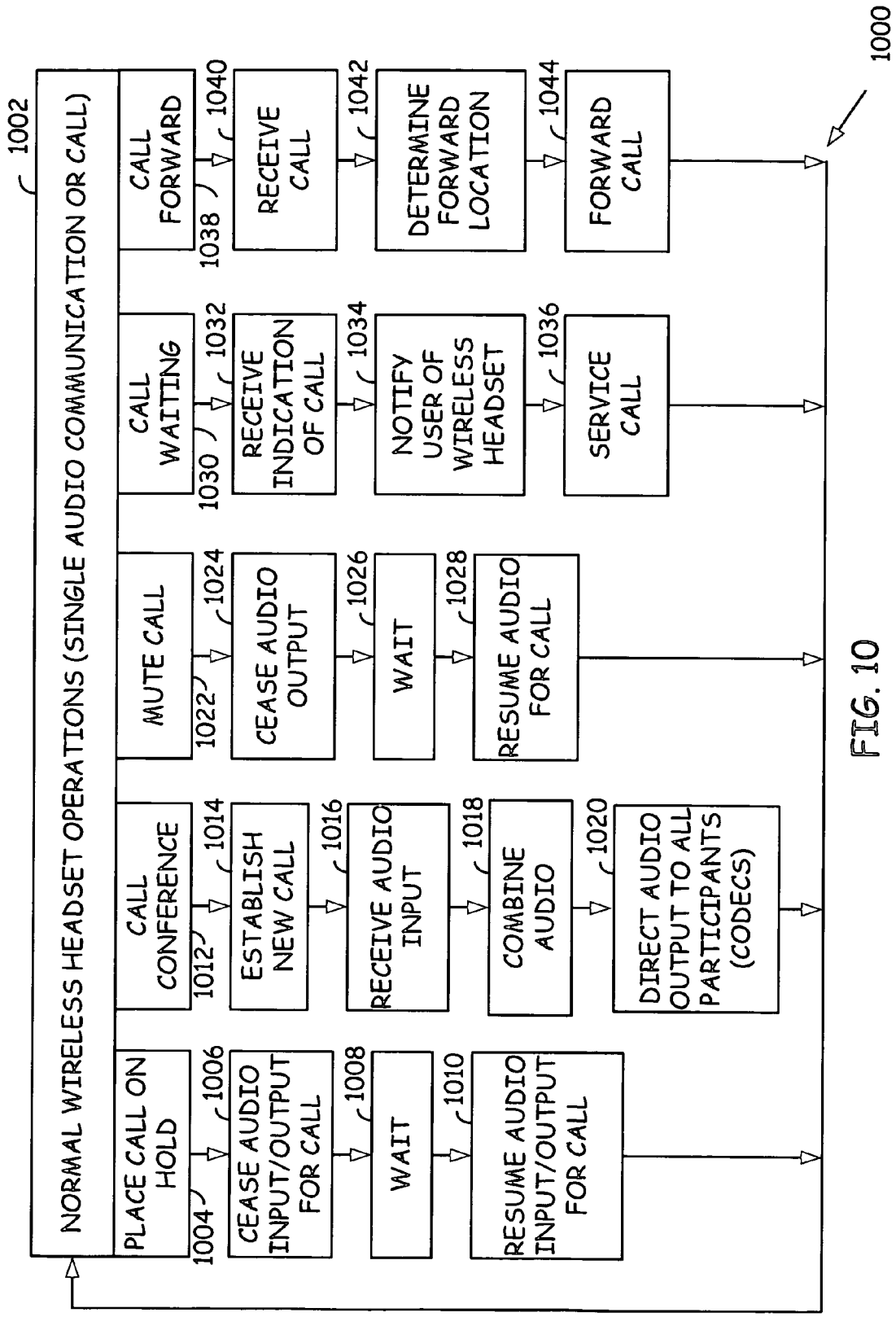
FIG. 10 is a logic diagram illustrating operation of a wireless headset in servicing multiple incoming audio streams.

FIG. 10 is a logic diagram illustrating operation of a wireless headset constructed according to the present invention in servicing multiple incoming audio streams. These audio streams may take the form of real-time two-way voice communications (i.e. telephone calls or radio network communications) or streamed audio from playback devices or other one-way wireless receivers. For the purpose of brevity, a call as described within FIG. 10 includes the above identified audio streams. The operations described with reference to FIG. 10 may be performed whole or in part by an on-chip processor within or coupled to processing modules 58 and 100 of FIGS. 6 and 7. During normal operations, normal operations when servicing playback devices may include pausing, rewinding, fast forwarding, going to bookmarked positions in the audio stream, and going to a live position in the audio stream by issuing commands through the user interface. Other modular devices, such as those of FIG. 2 that couple to the microphone or headset, may perform these operations.

When a second audio stream becomes available, an alert may be provided to a user via the user interface. The alert may take the form of visual, audible, or tactile stimuli that signals the user to the presence of the additional communication stream. This alert may prompt the user to select how the multiple audio streams are to be serviced. The user may make their selection through the user interface.

One particular operation that the wireless headset may perform is to place a call (audio stream) on hold (step 1004). In such case, the wireless headset ceases producing audio input and audio output for the call (step 1006). The wireless headset may also pause the audio stream (call). These operations are continued during a wait state (step 1008) until normal operations are resumed for the call (step 1010). In the case of pausing the audio, a memory buffer continues to store the incoming audio stream. When functioning as a playback device, memory within the headset may locally share all or a portion of the audio. Alternatively, the user interface may pause the stream directly at the playback device by issuing a command to the playback device through the base unit. From step 1010, operation proceeds to step 1002. The call hold operations of steps 1004-1010 may be performed in conjunction with the other operations of FIG. 10, e.g., call waiting, call muting, call conferencing, etc.

Call conferencing (step 1012) (or combining audio streams) may be initiated by the wireless headset or by a master device if the wireless headset does not have sufficient user interface for call conferencing initiation. In such case, a new call is established by the wireless headset (step 1014). This new call may be serviced by the additional channels serviced by the wireless headset. As was previously described, the wireless headset supports multiple channels. Using this multiple channels, the wireless headset receives audio input from all participants (step 1016) and combines the audio input, along with the input generated by the user of the wireless headset. The wireless headset then directs the combined audio to all participants (their servicing CODECs at step 1020). Note that these operations are continually performed for the duration of the conference call.

The wireless headset may also mute calls (step 1022). In such case, the wireless headset simply ceases all audio output (1024) and waits for the user of the wireless headset to cease the muting operations (step 1026). When the muting has been ceased, the wireless headset resumes the audio servicing of the call (step 1028).

The wireless headset also performs call waiting operations (step 1030). In such case, the wireless headset receives an indication that a call is inbound (step 1032). However, instead of immediately servicing the call, the wireless headset notifies the user of the wireless headset of the call (step 1034), e.g., provides a beeping indication to the user of the wireless headset. The wireless headset then services the call (step 1036), at the direction of the user to either complete the call, have the call join a currently serviced call (via call conferencing operations in some cases), or to ignore the call.

The wireless headset may also perform call forwarding operations according to the present invention (step 1038). In such case, the wireless headset receives the call (step 1040). However, instead of servicing the call, the wireless headset determines a forwarding location for the call (step 1042) and then forwards the call (step 1044). Operation from steps 1010, 1020, 1028, 1036, and 1044 return to step 1002.

Figure 11:
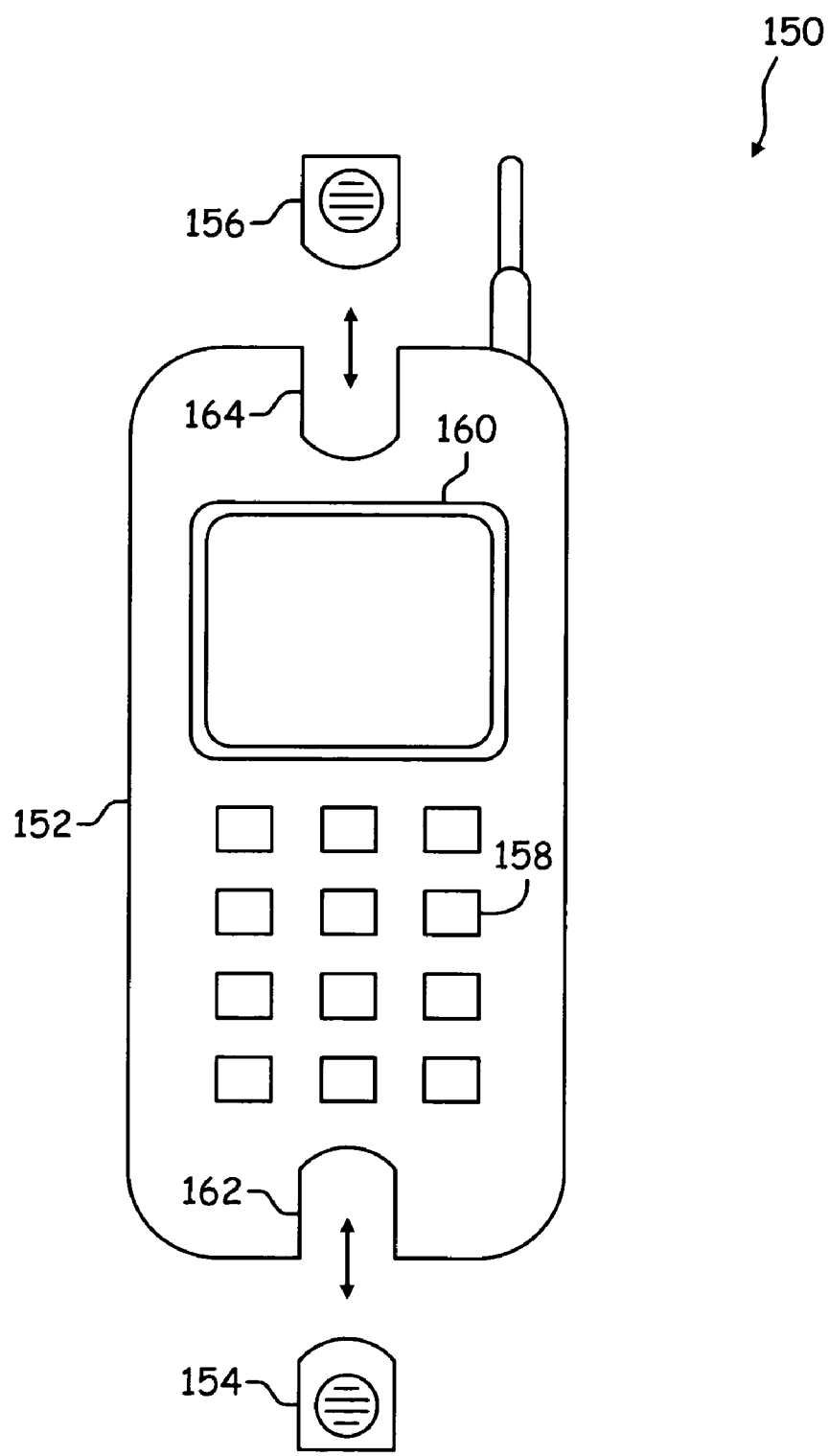
FIG. 11 is a diagram of a modular communication device in accordance with one embodiment of the present invention.

FIG. 11 is a schematic block diagram of modular communication device 150, such as a wireless terminal (e.g., cell phone or wireless packet data phone) that includes host device 152, detachable microphone 154 and detachable earpiece 156. In this embodiment, modular communication device 150 may function as a typical device (e.g., cellular telephone, CD player, cassette player, etc.) when detachable earpiece 156 and detachable microphone 154 are physically connected to host device 152. When detachable earpiece 156 is not in physical contact with host device 152, a wireless connection couples detachable earpiece 156 and host device 152. Similarly, when detachable microphone 154 is detached from host device 152, a second wireless connection couples detachable microphone 154 and host device 152. Alternatively, when detachable earpiece 156 and/or detachable microphone 154 are physically coupled to host device 152, they may communicate via a physical or wireless link. At this time, they may be paired and registered as well to the host device. As one of average skill in the art will appreciate, modular communication device 150 may include multiple detachable earpieces 156. In addition, modular communication device 150 may omit detachable microphone 154 if host device 152 is a playback type device (e.g., DVD player, CD player, cassette player, etc.). Similarly, modular communication device 150 may omit detachable earpiece 156 when functioning as a recording device (e.g., dictaphone). Detachable earpiece 156 and microphone 154 may have on-chip operations to support call conferencing, call waiting, flash, and other features associated with telephones. These functions may be accessed and reviewed by a user interface 158 and display 160 within host device 152 or a user interface and display located on either detachable earpiece 156 or microphone 154. The user interface and display, located on either the host device or detachable earpiece 156 and microphone 154 may have a display and button(s) that may be used to program device, perform directory functions including selecting number to call, view caller ID, initiate call waiting, or initiate call conferencing. Additionally, circuitry within the earpiece 156 and microphone 154 may enable voice activated dialing. The actual voice recognition could be performed within earpiece 156, microphone 154, or host device 152. Thus, earpiece 156 and microphone 154 may act to initiate calls and receive calls. In another embodiment, earpiece 156 and microphone 154 may register with a base unit, such as a cellular interface, to conserve battery life within the host device. Maintaining SIM information within the earpiece and microphone (headset) allows voice communications to be serviced without utilizing the host device. Additionally, upper protocol layers may be executed within the headset.

A link between earpiece 156 and microphone 154 would allow earpiece 156 and microphone 154 to share resources, such as battery life, and allow earpiece 156 and microphone 154 to be recharged from host device 152. Earpiece/microphone/base portion are included with cell phone battery. Cell phone battery has openings 162 and 164 located therein for storage/recharging of earpiece 156 and microphone 154. When located in these openings, the earpiece/microphone will be recharged from the cell phone battery. The new cell phone battery may include base portion RF interface and interface to cell phone port. Existing cell phone port technology could be used to treat the earpiece/microphone in the same manner as wired earpiece/microphone is treated.

Figure 12:
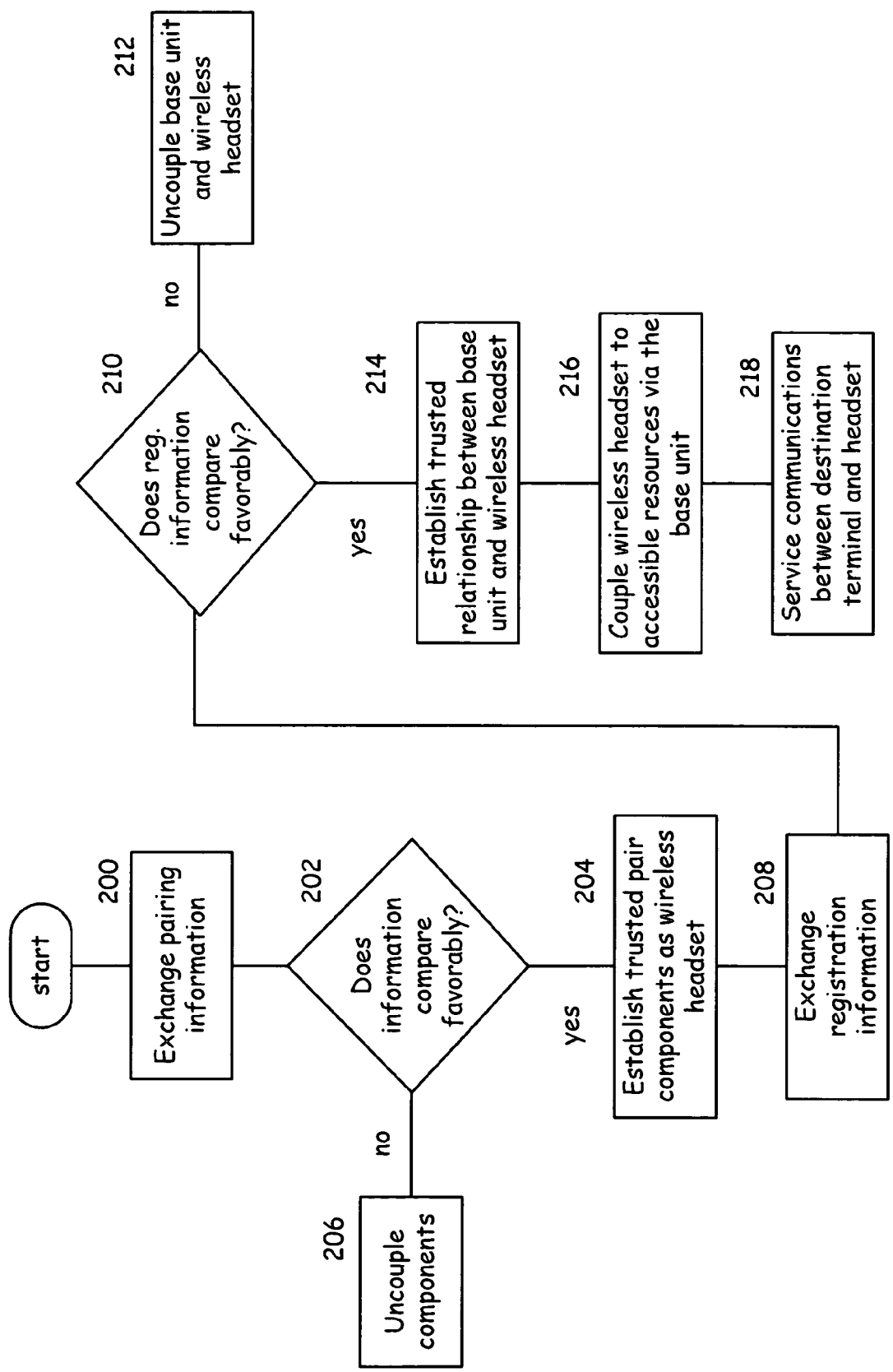
FIG. 12 is a logic diagram of a method for servicing voice communication with a wireless headset in accordance with one embodiment of the present invention.

FIG. 12 is a logic diagram of a method for servicing voice communications between the destination terminal and a modular wireless headset. This involves first in step 200 exchanging pairing information between components of the modular wireless headset. These components may include a wireless microphone, wireless earpiece, and other wireless components as previously described with respect to FIGs. In step 202, the pairing information is compared, and the determination is made as to whether or not the comparison is favorable. If the comparison is unfavorable, step 206 uncouples or fails to couple the components. If the comparison is favorable, step 204 establishes trusted pair relationship between the components that then form the wireless headset discussed in FIGS. 1 and 2. In step 208, registration information associated with the headset is exchanged with a base unit. Decision point 210 then determines whether or not the registration information compares favorably. If the registration information fails to compare favorably, communications are not permitted between the wireless headset and base unit as illustrated in step 212. Otherwise, a trusted relationship is established between the base unit and wireless headset in step 214. The establishment of a trusted relationship in step 214 allows a wireless headset in step 216 to couple to resources made accessible via the base unit. Although a trusted relationship is established, all resources accessible to the base unit may not be available as additional information may be required to access some resources. For example, SIM information may be required for access to a cellular network. These resources may include servicing networks for voice communications, such as cellular network, PSTNs, wide area networks, local area networks, wireless local area networks, and other like networks known to those skilled in the art. These resources may also include streamed or playback media made available through the base unit. Step 218 is the actual service of communications between the destination terminal and a headset, which may involve the authentication of SIM information as previously mentioned.

Figure 13:
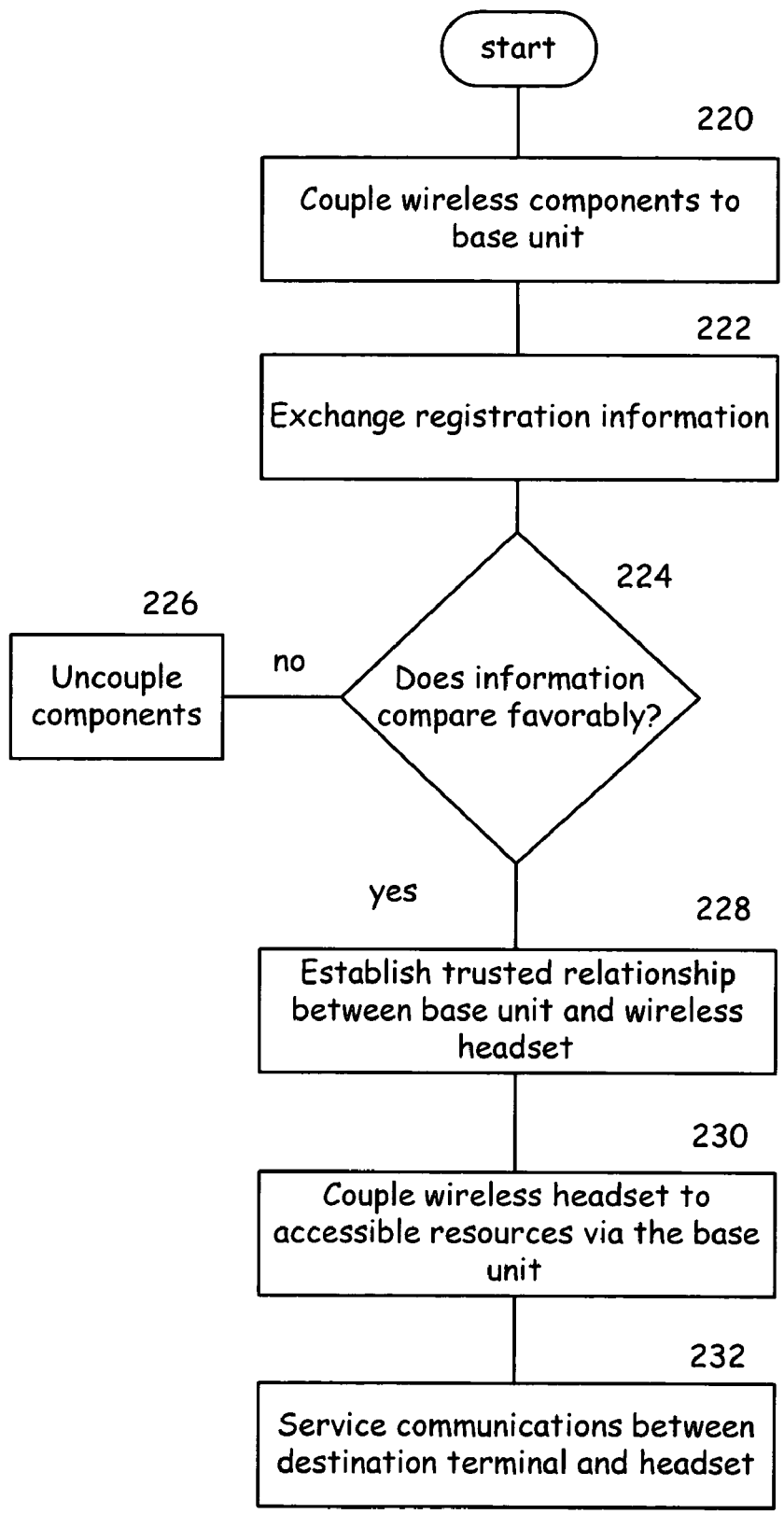
FIG. 13 is a logic diagram of a method for servicing voice communication with a wireless headset in accordance with one embodiment of the present invention.

FIG. 13 is a logical diagram that illustrates another method of servicing voice communications between a destination terminal and modular wireless headset in accordance with the present invention. Step 220 couples the wireless microphone and wireless earpiece that form the modular wireless headset to a base unit in order to exchange registration information. This coupling may involve physically docking the wireless microphone and wireless earpiece to the base unit or establishing wireless communications between the wireless microphone, wireless earpiece and the base unit. In Step 222, the registration information for these individual components and the base unit are exchanged. Decision point 224 determines whether or not the information compares favorably. In the event that registration information associated with individual components compares unfavorably, then those components may be uncoupled from the modular wireless headset in step 226. This may unfortunately result in the headset itself not being coupled to the base unit depending on the exact configuration of the modular wireless headset. In the case where the registration information compares favorably at decision point 224, a trusted relationship is established between the base unit and wireless headset in step 228. This allows the components of the wireless headset access to resources made available through the base unit in step 230. This allows the service of communications or the playback of streamed media between resources made available through the base unit and the headset. SIM information may be analyzed in order to access certain servicing networks. For example, voice communications may be serviced between a destination terminal and the headset.

In summary, the present invention provides a modular wireless headset to support multiple audio streams when registered to a base unit. This modular wireless headset includes both a wireless microphone and wireless earpiece. The wireless earpiece may further include a wireless interface, a processing circuit, a speaker, a user interface, and authentication module. The authentication module may include a pairing circuit and a registration circuit. The wireless interface allows the wireless earpiece to wirelessly communicate with the base unit that couples the modular wireless headset to a servicing network. This coupling to the service network and base unit only occurs when the headset is successfully registered to the base unit. The authentication module handles pairing, registration and access to servicing networks made available through the base unit. Components of the modular wireless headset that do not pair successfully are uncoupled from the headset. Wireless headsets that fail to register are communicatively uncoupled from the base unit. Furthermore, headsets having SIM information that fails to authenticate are unable to access certain servicing networks.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a modular communication device, modular wireless headset and modular wireless headphones. By physically separating the microphone from the earpiece and/or by separating the earpieces, more discrete components may be produced that are more comfortable to wear and are less cumbersome to use. As one of average skill in the art will appreciate, other embodiments may be derived from the teaching of the present invention without deviating from the scope of the claims.

What is claimed is:

1. A modular wireless headset operable to support multiple communications when paired with a base unit, comprising:
   a wireless microphone; and
   a wireless earpiece operable to exchange radio frequency (RF) signals with a base unit and render content within the exchanged RF signals to a user, wherein the wireless earpiece includes:
      a first wireless interface operable to communicate wirelessly with the base unit;

a first processing circuit operable to recover a first audio stream wirelessly communicated from the base unit;
a speaker communicatively coupled to the first processing circuit, wherein the speaker is operable to render the received first audio stream audible;
a first user interface communicatively coupled to the first processing circuit, wherein the first user interface is operable to:
   alert the user to a second audio stream being wirelessly communicated from the base unit to the first processing unit; and
   allow the user to service both the first audio stream and the second audio stream using the modular wireless headset; and
a first authentication module operable to:
   pair the wireless earpiece and wireless microphone; and
   register the modular wireless headset to use a base unit.

2. The modular wireless headset of claim 1, wherein the wireless microphone comprises:
a microphone transducer operable to transduce audio communications;
a second processing circuit communicatively coupled to the microphone transducer;
a second wireless interface communicatively coupled to the second processing circuit, wherein the second processing circuit and second wireless interface are operable to encode and wirelessly communicate transduced audio communications to the base unit directly or through the wireless earpiece; and
a second authentication module operable to:
   pair the wireless earpiece and wireless microphone; and
   register the modular wireless headset to use the base unit.

3. The modular wireless headset of claim 2, wherein the first user interface is further operable to allow the user to combine the first audio stream and the second audio stream.

4. The modular wireless headset of claim 2, wherein the first user interface is further operable to allow the user to pause at least one of the first audio stream and the second audio stream.

5. The modular wireless headset of claim 2, wherein either of the authentication modules is operable to pair and register the wireless headset and its modules using an authentication method selected from the group consisting of:
biometric authentication;
tactile authentication;
password authentication;
VRS authentication;
encryption key/dongle authentication;
handwriting authentication;
audio testing authentication;
third party authentication;
proximity based authentication; and
docking authentication.

6. The modular wireless headset of claim 5, wherein the base unit compares system identification module (SIM) information associated with the modular wireless headset with a database communicatively coupled to the base unit, and wherein when the SIM information compares favorably the base unit communicatively couples the modular wireless headset to a servicing network.

7. The modular wireless headset of claim 6, wherein the servicing network is selected from the group consisting of:
cellular network;
wireless packet data network;
public switched telephone network (PSTN);
wide area network (WAN);
local area network (LAN); and
a wireless local area network (WLAN).

8. The modular wireless headset of claim 5, further comprising at least one additional wireless module operable to pair to the wireless microphone and the wireless earpiece, and wherein the at least one additional wireless module comprises at least one device selected from the group consisting of:
a wireless earpiece, wireless microphone, a touchpad, and a text display.

9. The modular wireless headset of claim 2, wherein at least one of the first audio stream and the second audio stream is a communication selected from the group consisting of:
an audio stream from a wireless terminal;
an audio stream from a wireless access point (WAP);
an audio stream from a telephone;
an audio stream from a cellular telephone;
an audio stream from a compact disc player;
an audio stream from a DVD player;
an audio stream from a digital playback device;
an audio stream from a computer;
an audio stream from a personal digital assistant; and
an audio stream from a playback device.

10. A method to service multiple audio communications with a modular wireless headset, comprising:
communicatively coupling a wireless microphone and a wireless earpiece of the modular wireless headset to a base unit to exchange registration information in response to a user command;
comparing registration information associated with the wireless microphone and the wireless earpiece to registration information associated with the base unit;
successfully registering the wireless microphone and the wireless earpiece to the base unit when the registration information associated with the wireless microphone and the wireless earpiece compares favorably to registration information associated with the base unit;
uncoupling the wireless microphone or the wireless earpiece that fails to successfully register to the base unit;
communicatively coupling the modular wireless headset to an audio communication through the base unit; and
servicing a first audio communication with the modular wireless headset and a resource accessible to the modular wireless headset through the communicatively coupled base unit, and wherein servicing further includes:
   alerting the user to a second audio communication being wirelessly communicated from the resource to the modular wireless headset; and
   servicing the first audio communication in accordance with a first service and the second audio communication using in accordance with a second service based on user input.

11. The method of claim 10, wherein:
the servicing the first audio communication in accordance with the first service and the second audio communication using in accordance with the second service involves combining the first audio communication and the second audio communication.

12. The method of claim 10, wherein:
the servicing the first audio communication in accordance with the first service and the second audio communication using in accordance with the second service involves pausing at least one of the first audio communication and the second audio communication for later rendering to the user.

13. The method of claim 10, wherein at least one of the first audio communication and the second audio communication is a communication selected from the group consisting of:
   an audio stream from a wireless terminal;
   an audio stream from a wireless access point (WAP);
   an audio stream from a telephone;
   an audio stream from a cellular telephone;
   an audio stream from a compact disc player;
   an audio stream from a DVD player;
   an audio stream from a computer;
   an audio stream from a personal digital assistant; and
   an audio stream from a playback device.

14. The method of claim 10, wherein the base unit is operable to communicatively couple the headset to a servicing network.

15. The method of claim 14, wherein the servicing network is selected from the group consisting of:
   cellular network;
   wireless packet data network;
   public switched telephone network (PSTN);
   wide area network (WAN);
   local area network (LAN); and
   a wireless local area network (WLAN).

16. The method of claim 15, wherein the base unit compares system identification module (SIM) information associated with the modular wireless headset with a database communicatively coupled to the base unit, and wherein when the SIM information compares favorably the base unit communicatively couples the modular wireless headset to the servicing network.

17. A modular wireless headset operable to support multiple communications when paired with a base unit, comprising:
   a wireless microphone; and
   a wireless earpiece operable to exchange radio frequency (RF) signals with a base unit and render content within the exchanged RF signals to a user, wherein the wireless earpiece includes:
      a first wireless interface operable to communicate wirelessly with the base unit;
      a first processing circuit operable to recover a first audio communication wirelessly communicated from the base unit;
      a speaker communicatively coupled to the first processing circuit, wherein the speaker is operable to render the received first audio communication audible;
      a first user interface communicatively coupled to the first processing circuit, wherein the first user interface is operable to:
         alert the user to a second audio communication being wirelessly communicated from the base unit to the first processing unit; and
         allow the user to service both the first audio communication and the second audio communication using the modular wireless headset; and
      a first authentication module operable to:
         provide system identification module (SIM) information associated with the modular wireless headset to the base unit in order to access a servicing network;
         pair the wireless earpiece and wireless microphone; and
         register the modular wireless headset to use a base unit.

18. The modular wireless headset of claim 17, wherein the wireless microphone comprises:
   a microphone transducer operable to transduce audio communications;
   a second processing circuit communicatively coupled to the microphone transducer;
   a second wireless interface communicatively coupled to the second processing circuit, wherein the second processing circuit and second wireless interface are operable to encode and wirelessly communicate transduced audio communications to the base unit directly or through the wireless earpiece; and
   a second authentication module operable to: pair the wireless earpiece and wireless microphone; and register the modular wireless headset to use the base unit.

19. The modular wireless headset of claim 17, wherein the first user interface is further operable to allow the user to combine the first audio communication and the second audio communication.

20. The modular wireless headset of claim 17, wherein the first user interface is further operable to allow the user to pause at least one of the first audio communication and the second audio communication.

21. The modular wireless headset of claim 17, wherein the first authentication module is operable to pair and register the wireless headset and its modules using an authentication method selected from the group consisting of:
   biometric authentication;
   tactile authentication;
   password authentication;
   VRS authentication;
   encryption key/dongle authentication;
   handwriting authentication;
   audio testing authentication;
   third party authentication;
   proximity based authentication; and
   docking authentication.

22. The modular wireless headset of claim 17, wherein at least one of the first audio communication and the second audio communication is a communication selected from the group consisting of:
   an audio stream from a wireless terminal;
   an audio stream from a wireless access point (WAP);
   an audio stream from a telephone;
   an audio stream from a cellular telephone;
   an audio stream from a compact disc player;
   an audio stream from a DVD player;
   an audio stream from a digital playback device;
   an audio stream from a computer;
   an audio stream from a personal digital assistant; and
   an audio stream from a playback device.

23. The modular wireless headset of claim 17, wherein the servicing network is selected from the group consisting of:
   cellular network;
   wireless packet data network;
   public switched telephone network (PSTN);
   wide area network (WAN);
   local area network (LAN); and
   a wireless local area network (WLAN).

* * * * *

UNITED STATES PATENT AND TRADEMARK OFFICE
CERTIFICATE OF CORRECTION

PATENT NO. : 7,558,529 B2
APPLICATION NO. : 11/120676
DATED : July 7, 2009
INVENTOR(S) : Nambirajan Seshadri, James D. Bennett and Jeyhan Karaoguz It is certified that error appears in the above-identified patent and that said Letters Patent is hereby corrected as shown below:

Title Page, (*) Notice, please replace "This patent is subject to a terminal disclaimer" with --This patent is subject to a terminal disclaimer, and specifically with respect to co-pending "reference" applications 11/120,765; 11/120,904; 11/120,902; 11/120,455; 11/120,903; 11/120,752 and prior U.S. patent 7,343,177.--

Signed and Sealed this

Sixteenth Day of November, 2010

David J. Kappos
*Director of the United States Patent and Trademark Office*

Disclaimer

7,558,529 B2 — Nambirajan Seshadri, Irvine, CA (US); James D. Bennett, San Clemente, CA (US); Jeyhan Karaoguz, Irvine, CA (US). EARPIECE/MICROPHONE (HEADSET) SERVICING MULTIPLE INCOMING AUDIO STREAMS. Patent dated Jul. 07, 2009. Disclaimer filed Oct. 07, 2010 by the Owner, Broadcom Corporation.

Hereby disclaim the entire term of said patent.

(*Official Gazette* December 28, 2010)